US010430898B2

United States Patent
Sun et al.

(10) Patent No.: US 10,430,898 B2
(45) Date of Patent: Oct. 1, 2019

(54) METHOD AND SYSTEM FOR FACILITATING ELECTRICITY SERVICES

(71) Applicant: NAD Grid Corp, Cupertino, CA (US)

(72) Inventors: Thomas Shaofeng Sun, Sunnyvale, CA (US); Gustavo Oscar Collantes, Chicago, IL (US); Xiaoyao Qian, Champaign, IL (US); Herval Freire de Albuquerque Junior, Walnut Creek, CA (US); Rui Zhang, Menlo Park, CA (US)

(73) Assignee: NAD GRID CORP, Cupertino, CA (US)

( * ) Notice: Subject to any disclaimer, the term of this patent is extended or adjusted under 35 U.S.C. 154(b) by 0 days.

(21) Appl. No.: 16/049,800

(22) Filed: Jul. 30, 2018

(65) Prior Publication Data

US 2019/0172159 A1    Jun. 6, 2019

Related U.S. Application Data

(60) Provisional application No. 62/595,546, filed on Dec. 6, 2017.

(51) Int. Cl.
| | | |
|---|---|---|
| *G06Q 50/06* | (2012.01) | |
| *G06Q 30/00* | (2012.01) | |
| *G06Q 10/06* | (2012.01) | |

(52) U.S. Cl.
CPC ....... *G06Q 50/06* (2013.01); *G06Q 10/06315* (2013.01); *G06Q 30/018* (2013.01)

(58) Field of Classification Search
CPC . G06Q 50/06; G06Q 10/06315; G06Q 30/018
(Continued)

(56) References Cited

U.S. PATENT DOCUMENTS

| | | |
|---|---|---|
| 9,480,188 B2 | 10/2016 | Orsini et al. |
| 2003/0036820 A1* | 2/2003 | Yellepeddy ............ G05B 15/02 700/291 |

(Continued)

FOREIGN PATENT DOCUMENTS

| | | |
|---|---|---|
| EP | 3193299 A1 | 7/2017 |
| WO | 2017199053 A1 | 11/2017 |

OTHER PUBLICATIONS

Greenspan, Gideon; "Ending the bitcoin vs blockchain debate"; Posted Jul. 19, 2015, available at: https://www.multichain.com/blog/2015/07/bitcoin-vs-blockchain-debate/ (last visited Nov. 17, 2018) (Year: 2015).*

(Continued)

*Primary Examiner* — Kevin H Flynn
*Assistant Examiner* — Emmett K. Walsh
(74) *Attorney, Agent, or Firm* — Growth IP; Brian Lao

(57) ABSTRACT

Embodiments of a method and/or system for facilitating electricity services can include collecting a set of electricity provision parameters from one or more providing parties, collecting a set of electricity request parameters from a receiving party, determining a services match between the providing party and the receiving party based on the set of electricity provision parameters and the set of electricity request parameters, processing an electricity services transaction based on the services match between the providing party and the receiving party, and/or dynamically facilitating electricity services between the providing party and the receiving party based on the electricity services transaction.

17 Claims, 10 Drawing Sheets

(58) Field of Classification Search
USPC .......................................................... 705/7.35
See application file for complete search history.

(56) References Cited

U.S. PATENT DOCUMENTS

| | | | |
|---|---|---|---|
| 2011/0046792 A1* | 2/2011 | Imes | F24F 11/63 |
| | | | 700/278 |
| 2011/0055036 A1* | 3/2011 | Helfan | G06Q 30/04 |
| | | | 705/26.1 |
| 2011/0184574 A1* | 7/2011 | Le Roux | G01D 4/004 |
| | | | 700/291 |
| 2014/0375126 A1* | 12/2014 | Kitagishi | G06Q 30/06 |
| | | | 307/29 |
| 2015/0081374 A1* | 3/2015 | Sahlstrom | G06Q 10/06315 |
| | | | 705/7.25 |
| 2015/0195954 A1 | 7/2015 | Orsini | |
| 2016/0284033 A1 | 9/2016 | Winand et al. | |
| 2017/0083989 A1 | 3/2017 | Brockman et al. | |
| 2017/0103468 A1 | 4/2017 | Orsini et al. | |
| 2017/0358041 A1* | 12/2017 | Forbes, Jr. | H02J 13/001 |
| | | | 13/1 |
| 2018/0066860 A1* | 3/2018 | Carlson | F24F 11/30 |
| 2018/0130130 A1* | 5/2018 | Dechu | G06Q 50/06 |
| 2018/0240201 A1* | 8/2018 | Eda | G06Q 50/06 |

OTHER PUBLICATIONS

Murkin et. al., "Enabling peer-to-peer electricity trading"; 4th international conference on ICT sustainability (ICT4S 2016) (Year: 2016).*

* cited by examiner

METHOD AND SYSTEM FOR FACILITATING ELECTRICITY SERVICES

CROSS-REFERENCE TO RELATED APPLICATIONS

This application claims the benefit of U.S. Provisional Application Ser. No. 62/595,546, filed on 6 Dec. 2017, which is incorporated herein in its entirety by this reference.

TECHNICAL FIELD

The disclosure generally relates to electricity services.

DESCRIPTION OF THE EMBODIMENTS

The following description of the embodiments is not intended to limit the invention to these embodiments, but rather to enable any person skilled in the art to make and use.

1. Overview

As shown in FIGS. 1-4, embodiments of a method 100 for facilitating electricity services (e.g., electricity exchange between one or more providing parties and one or more receiving parties; electricity exchange services and/or ancillary services associated with electricity; etc.) can include: collecting a set of electricity provision parameters (e.g., a power parameter, a power provision time parameter, a price parameter, etc.) from one or more providing parties (e.g., electricity seller; electricity provider; a utility entity; etc.) S110; collecting a set of electricity request parameters (e.g., a power reception parameter, a power reception time parameter, a payment parameter, etc.) from a receiving party (e.g., electricity purchaser; electricity consumer; etc.) S120; determining one or more services matches (e.g., an exchange match for electricity exchange between a providing party and a receiving party; etc.) between one or more providing parties and one or more receiving parties based on the set of electricity provision parameters and the set of electricity request parameters (e.g., matching the providing party and the receiving party based on the set of electricity provision parameters satisfying the set of electricity request parameters; and/or based on other suitable parameters such as grid parameters (e.g., grid balancing parameters; etc.) accounting for the feasibility and/or costs associated with utilizing a distribution grid and/or suitable distribution system for one or more transactions; etc.) S130; processing an electricity services transaction such as an electricity exchange transaction (e.g., generating a programmatic contract; recording electricity services transaction parameters to a decentralized network system; etc.), based on the services match between the providing party and the receiving party S140; and/or dynamically facilitating electricity services (e.g., electricity exchange, etc.) between the providing party and the receiving party based on the electricity services transaction S150. However, embodiments of the method 100 can include any suitable processes for facilitating electricity services.

Figure 1:
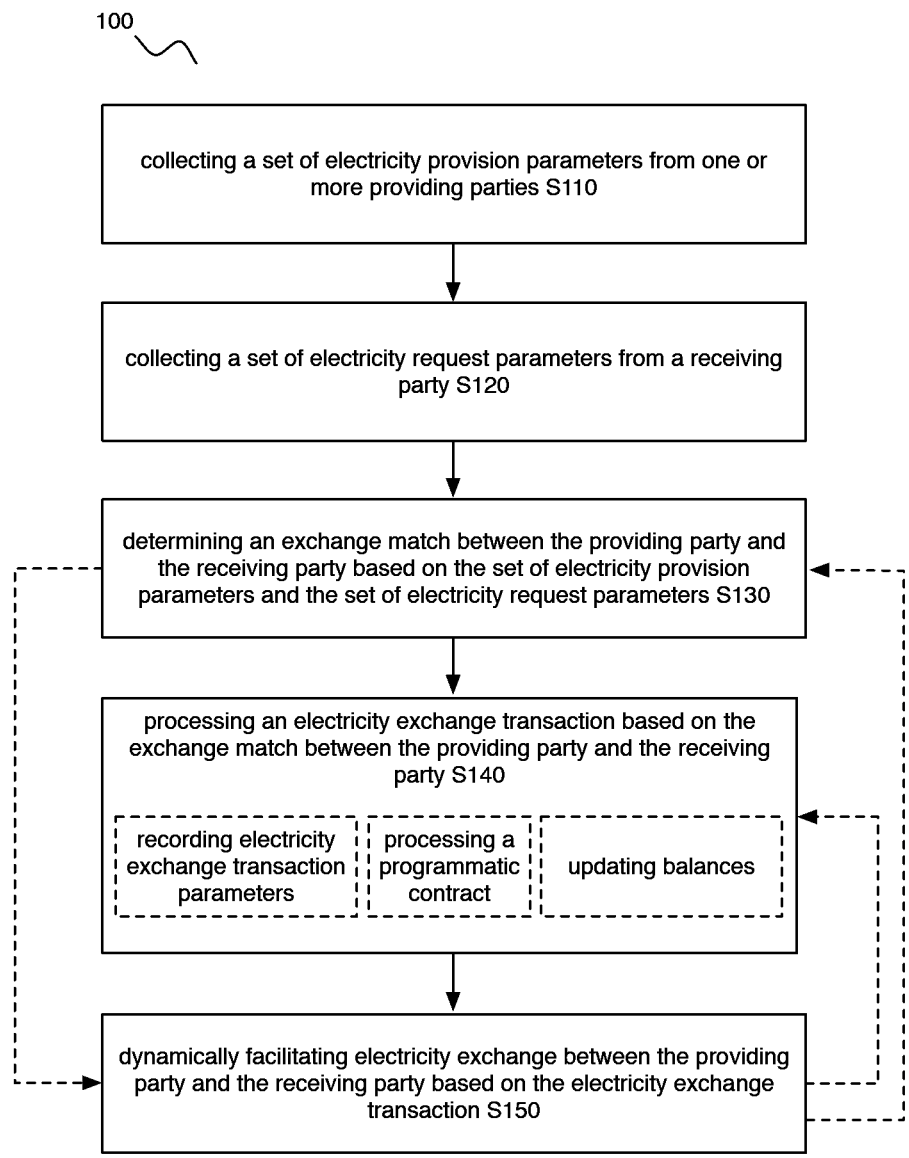
FIG. 1 includes a flowchart representation of variations of an embodiment of a method.
Figure 2:
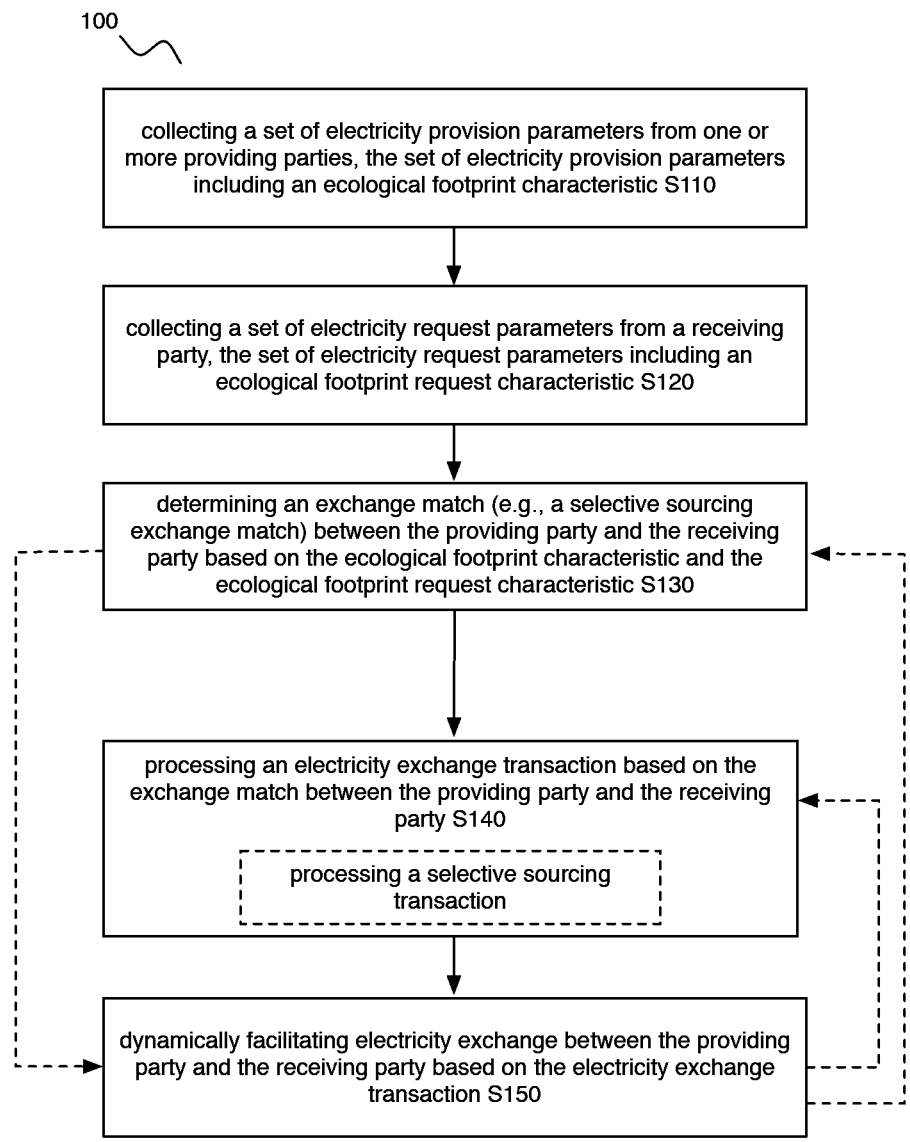
FIG. 2 includes a flowchart representation of variations of an embodiment of a method.
Figure 3:
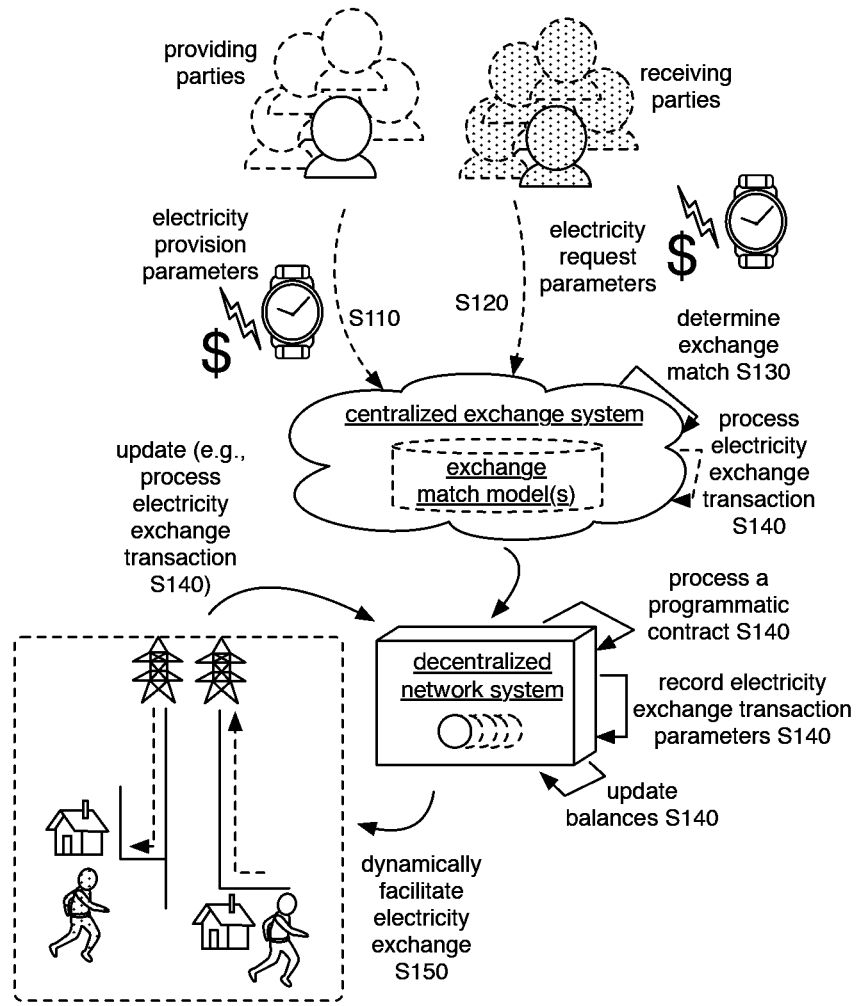
FIG. 3 includes a flowchart representation of variations of an embodiment of a method.
Figure 4:
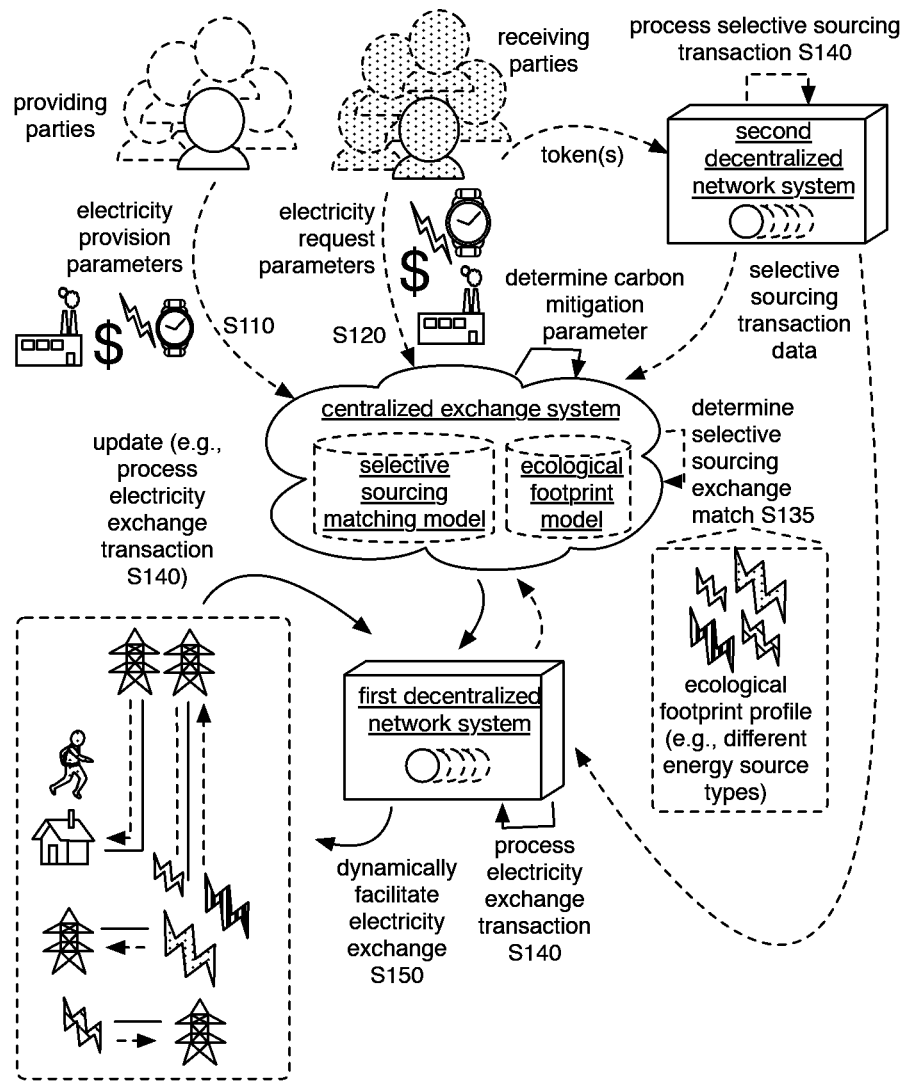
FIG. 4 includes a flowchart representation of variations of an embodiment of a method.

In a specific example, as shown in FIGS. 2 and 4, the method 100 can include collecting a set of electricity provision parameters from a providing party, where the set of electricity provision parameters includes an ecological footprint characteristic (e.g., a carbon footprint characteristic associated with a specific carbon footprint of power provision by the providing party; etc.); collecting a set of electricity request parameters from a receiving party, where the set of electricity request parameters includes an ecological footprint request characteristic (e.g., a maximum carbon footprint per unit of power to be consumed; a maximum total carbon footprint associated with power consumption by the receiving party; etc.); determining a services match (e.g., an exchange match, etc.) between the providing party and the receiving party based on the ecological footprint characteristic (and/or suitable electricity provision parameters) and the ecological footprint request characteristic (and/or suitable electricity request parameters); processing, with a decentralized network system, an electricity services transaction (e.g., an electricity exchange transaction, etc.) based on the services match between the providing party and the receiving party; and dynamically facilitating electricity services (e.g., electricity exchanges, etc.) between the providing party and the receiving party based on the electricity services transaction.

Embodiments of the method 100 and/or the system 200 can function to leverage centralized and/or decentralized systems to match and/or enable providing parties and receiving parties (and/or other suitable parties) to exchange electricity and/or participate in other electricity-related services (e.g., provide and/or facilitate such services, receive such services; etc.), such as based on real-time supply and demand (e.g., in relation to price, ecological footprint characteristics, power, volume, etc.).

Additionally or alternatively, data described herein (e.g., electricity provision parameters, electricity request parameters, electricity services transaction parameters, providing party data, receiving party data, electricity services parameters associated with the dynamically facilitated electricity services, model outputs, model inputs, etc.) can be associated with any suitable temporal indicators (e.g., seconds, minutes, hours, days, weeks, time periods, time points, timestamps, etc.) including one or more: temporal indicators indicating when the data was collected, determined, transmitted, received, and/or otherwise processed; temporal indicators providing context to content described by the data, such as temporal indicators associated with specific carbon footprints for a given time period (e.g., where specific carbon footprint varies over time; etc.), temporal indicators associated real time price parameters; changes in temporal indicators (e.g., data over time; change in data; data patterns; data trends; data extrapolation and/or other prediction; etc.); and/or any other suitable indicators related to time.

Additionally or alternatively, parameters, metrics, inputs, outputs, and/or other suitable data can be associated with value types including: scores, confidence levels, identifiers, values along a spectrum, and/or any other suitable types of values. Any suitable types of data described herein can be used as inputs (e.g., for different models described herein, such as services match models, ecological footprint models; for portions of the method 100; etc.), generated as outputs (e.g., of models), and/or manipulated in any suitable manner for any suitable components associated with the method 100 and/or system 200.

One or more instances and/or portions of the method 100 and/or processes described herein can be performed asynchronously (e.g., sequentially), concurrently (e.g., considering all or subsets of providing parties and receiving parties simultaneously in determining a services match; performing processes of the method 100 concurrently on different threads for parallel computing to improve system processing ability for facilitating electricity services; etc.), in temporal relation to a trigger event (e.g., performance of a portion of the method 100), and/or in any other suitable order at any suitable time and frequency by and/or using one or more instances of the system 200, components, and/or entities described herein.

Embodiments of the system 200 can include a centralized services system (e.g., for processing electricity provision parameters and/or electricity request parameters; for determining services matches between providing parties and receiving parties; for providing backend outputs to be presented to providing parties and/or receiving parties at providing party interfaces and/or receiving party interfaces; "NAD Exchange"; a centralized exchange system; etc.); a first decentralized network system (e.g., for determining, executing, recording, and/or otherwise facilitating electricity services transactions; a blockchain-based system such as a consortium blockchain-based system and/or other suitable blockchain-based system; "NAD Lattice"; etc.); a second decentralized network system (e.g., for facilitating selective sourcing services matches and/or selective sourcing transactions for providing access to, implementing, and/or otherwise facilitating selective sourcing for one or more receiving parties; a token-based blockchain system; an Ethereum blockchain system; etc.); a set of user interfaces (e.g., graphic user interfaces; a providing party interface for providing parties to interface with components of the system 100, such as the centralized services system; a receiving party interface for receiving parties to interface with components of the system 100, such as the centralized services system; etc.); a communication platform (e.g., for supporting private negotiation resulting in a programmatic contract to be executed by the first decentralized network system; "NAD OTC"; etc.); a distributed energy protocol (e.g., for dynamically facilitating physical electricity services; etc.); and/or any other suitable components. Embodiments of the system 200 can include any suitable number of centralized systems and/or decentralized systems with any suitable distribution of functionality across the systems (e.g., any suitable distribution of processes of embodiments of the method 100 for performance by the one or more systems, etc.). For example, the system 200 can include a fully decentralized system (e.g., for performing each of the processes of embodiments of the method 100), which can function to perform any of the processes of embodiments of the method 100. In a specific example, a fully decentralized system can function to process electricity provision parameters and/or electricity request parameters; determine services matches between providing parties and receiving parties; process electricity services transactions (e.g., generate programmatic contracts; record electricity service transaction parameters to one or more associated distributed ledgers; facilitate clearing services such as for account balances associated with parties participating in the decentralized system; etc.); and/or dynamically facilitate electricity services (e.g., electricity exchange; etc.) between the providing party and the receiving party based on the electricity services transaction.

The system and/or portions of the system can entirely or partially be executed by, hosted on, communicate with, and/or otherwise include: a remote computing system (e.g., a server, at least one networked computing system, stateless, stateful; etc.), a local computing system, providing party devices and/or receiving party devices (e.g., mobile phone device, other mobile device, personal computing device, tablet, wearable, head-mounted wearable computing device, wrist-mounted wearable computing device, etc.), databases, application programming interfaces (APIs) (e.g., for accessing data described herein, etc.) and/or any suitable component. Communication by and/or between any components of the system can include wireless communication (e.g., WiFi, Bluetooth, radiofrequency, Zigbee, Z-wave, etc.), wired communication, and/or any other suitable types of communication.

The components of the system 200 can be physically and/or logically integrated in any manner (e.g., with any suitable distributions of functionality across the components, such as in relation to portions of the method 100; etc.). For example, portions of the method 100 can be performed with a single decentralized network system (e.g., a single blockchain-based system). In another example, portions of the method 100 can be performed with a plurality of decentralized network systems. Additionally or alternatively, components of the system 200 can be integrated with any suitable existing components. For example, components of the system 200 can be overlaid on, interface with, communicate with, and/or have any suitable relationship to one or more electrical grids (e.g., existing electrical grid infrastructure; distribution grids; etc.). In a specific example, utility entities can participate in one or more decentralized network systems; provide data for use in portions of the method 100 (e.g., determining specific carbon footprint; verifying electricity services transactions based on physical electricity services data; etc.); and/or be associated with any suitable portion of the method 100. However, the method 100 and/or system 200 can be configured in any suitable manner.

2. Examples

In examples, the system and/or method can confer at least several improvements over conventional approaches. Specific examples of the method 100 and/or system 200 can confer technologically-rooted solutions to issues associated with electricity provision and/or consumption.

First, the technology (e.g., embodiments of the method 100 and/or system 200; etc.) can transform entities (e.g., receiving parties, such as entities consuming electricity; providing parties, such as entities providing electricity; utility entities such as utilities associated with an electrical grid; other entities associated with an electrical grid; the electrical grid itself; etc.) into different states or things. In examples, embodiments of the method 100 and/or system 200 can cause power to be provided by one or more providing parties (e.g., causing a providing party to supply power to an electrical grid; etc.) and/or can cause power to be consumed by one or more receiving parties (e.g., causing a receiving party to receive power from an electrical grid; etc.), such as based on outputs (e.g., services match determinations; specific carbon footprint determinations; programmatic contracts; control instructions for devices associated with an electrical grid; etc.) determined by portions of the method 100, and/or based on any suitable data. In an example, the technology can transform energy markets (e.g., by providing a real-time electricity services platform and/or other components of the system 200), encourage increased adoption of renewable energy; incentivize distributed storage of renewable energy; reduce utility bills for consumers; increase optimization of surplus renewable energy; reduce energy laundering (e.g., laundering associated with batteries; leveraging decentralized network systems to improve authenticity associated with energy certificates; etc.) and/or can transform any suitable entities and/or processes. In a specific example, the technology can unify multiple energy markets, such as the residential energy procurement (REP) market (e.g., where competition can be focused on the selling side, where sellers set and/or propose prices; etc.) and ancillary services (AS) market (e.g., where distribution system operators or distribution utilities are the sole buyers with alternative solutions besides bids; etc.). The technology can enable distributed energy resource (DER) owners (and/or suitable providing parties, etc.) to optimize revenue by selling electricity (e.g., in the form of energy, power, etc.) to suitable receiving parties (e.g., buyers, consumers, etc.).

Second, the technology can improve functionality of computing systems (e.g., centralized services systems; decentralized network systems; computing systems receiving power through portions of the method 100 and/or system 200; etc.). In an example, the technology can improve security associated with electricity services transactions, such as via one or more decentralized network systems (e.g., by reducing double-spending through node-based verification of electricity services transactions; by improving security against attacks, such as through the decentralized node-based technology; through leveraging a consortium blockchain-based system where identities of participating parties can be known and attacks can be identifiable; etc.). In an example, the technology can improve the traceability (e.g., where market data and/or other suitable data can be protected, such as being permitted to be accessible by only a subset of parties and/or party types; etc.) associated with electricity services transactions (e.g., by using one or more decentralized network systems for maintaining traceability regarding electricity services transactions in a distributed ledger, and/or by allowing auditing of electricity services transactions; etc.). In an example, the technology can improve data privacy, where cryptographic primitives and secure multiparty computations can guard personal data associated with electricity services transactions (e.g., power consumption data), while still maintaining traceability such as for auditing purposes. In an example, the technology can improve computational processing, such as by leveraging a consortium blockchain-based system where a predetermined set of nodes can control a consensus process for supporting faster and/or scalable transactions.

Third, the technology can include an inventive distribution of functionality across a network of one or more centralized computing systems (e.g., a centralized services system; a centralized communication platform for facilitating communication between providing parties and receiving parties; etc.), decentralized network systems (e.g., blockchain-based systems, etc.), user interfaces; and/or other suitable components (e.g., components of the system 100, etc.). In an example, embodiments of the system 200 can include one or more centralized computing systems (e.g., facilitating matching between providing parties and receiving parties; facilitating electricity services transaction negotiation; etc.) configured on top of one or more decentralized network systems (e.g., associated with user accounts; configured to interface with an electrical grid for facilitating electricity services; configured to facilitate monetary services such as monetary exchange associated with electricity services transactions; etc.). In an example, the technology can include a community network where participants can bring different resources (e.g., small-scale renewable generation, utility-scale renewable generation, distribution-side stationary storage, energy conversion assets, etc.) and/or perform different tasks (trade electricity, provide information, trade capacity, trade carbon commodities, etc.). In a specific example, DER owners, solar developers, consumers, electric utilities, auto companies, and/or other market agents can convene through portions of the method 100 and/or components of the system 200 to contribute different resources and/or perform different tasks, such as to deliver a distribution system operator (DSO) solution.

Fourth, the technology can confer improvements in the technical fields of at least electricity services, associated security, associated traceability, associated privacy, associated computational processing, applications of decentralized network systems, modeling associated with electricity services, and/or other suitable technical fields.

Fifth, the technology can additionally or alternatively reduce damage to an electrical grid (e.g., through real time alignment of supply and demand; etc.); improve reliability of power provision service (e.g., by enabling electricity sourcing from a plurality of providing parties; etc.); reduce electricity price (e.g., through facilitating competition; through minimizing electricity services transaction fees; etc.); improve benefits for residential solar users; improve demand response savings with real time prices; reduce carbon emission by facilitating selective sourcing of energy (e.g., to meet ecological footprint request characteristics; etc.); discourage over-generation of energy (e.g., through determination of real time fair market prices; etc.); and/or promote cleaner energy generation (e.g., through differentiation of ecological footprint characteristics associated with different types of energy generation; etc.). However, in specific examples, the technology can provide any other suitable improvements, such as in the context of using non-generalized processing systems and/or other suitable components; performing suitable portions of the method 100; and/or applying suitable components of the system 200.

3.1 Collecting Electricity Provision Parameters

Embodiments of the method 100 can include collecting a set of electricity provision parameters from one or more providing parties S110, which can function to determine data associated with (e.g., informative of; descriptive of; etc.) potential and/or actual electricity provision by one or more providing parties.

Providing parties can include any one or more of: electricity sellers, electricity providers, utility entities, energy generation entities such power plant entities, DER providers, distribution owners, power retailers, independent system operators (ISOs), microgrid operators, and/or any other suitable types of entities associated with energy provision.

Electricity provision parameters can include any one or more of: ecological footprint characteristics (e.g., descriptive and/or otherwise informative of a specific carbon footprint associated with the providing party's electricity provision; etc.); electricity parameters (e.g., a power provision parameter such as describing an amount of power provision in kilowatt-hour (kWh); an energy provision parameter such as describing an amount of energy provision in kilowatts (kW); etc.); electricity provision time parameters (e.g., a power provision time parameter such as describing a time period for which power will be provided, such as at the rate described by a power provision parameter; etc.); price parameters (e.g., describing a price and/or range of prices that a providing party is willing to sell electricity for, such as a price parameter corresponding to a power provision parameter and/or a power provision time parameter; etc.); liability restriction condition preferences (e.g., preferences for the form of liability associated with corresponding electricity services transactions, such as liability based on a specified power output or an expected power output, etc.); identifiers (e.g., identifying providing parties; identifying energy sources; identifying storage sources; etc.); providing party data (e.g., type of providing party; location of providing party; historic electricity provision data such as informative of an electricity provision profile for the providing party; historic electricity services transactions; historic electricity provision parameters; etc.) and/or any other suitable parameters associated with electricity provision.

Ecological footprint characteristics can include any one or more of energy source characteristics (e.g., type of energy source such as solar, wind, hydro, battery, natural gas, nuclear, coal, natural gas, geo thermal, bio fuel; variance of carbon emissions over time for an energy source; etc.); storage source characteristics (e.g., storage type such as private storage on premise, grid storage integrated with a local utilities infrastructure, fuel cell; other storage types storage capacity; storage location; carbon emission tracing characteristics associated with the energy storage; etc.), and/or other suitable characteristics associated with ecological footprint corresponding to electricity generation, transmission, distribution, and/or other suitable aspects.

Ecological footprint characteristics can include carbon footprint characteristics (e.g., describing emissions associated with carbon dioxide, methane, carbon monoxide, hydrocarbons, and/or other carbon-based components; specific carbon footprint; etc.), other emission-related characteristics (e.g., describing emissions associated with nitrogen oxides, particular matter, sulfur oxides, volatile organic compounds, and/or other suitable pollutants; emission performance parameters, such as amount of emitted pollutant per megawatt-hour; etc.), and/or other suitable characteristics associated with emissions.

In a specific example, an ecological footprint characteristic can include an amount of carbon dioxide, methane, and nitrous oxide emitted in kilograms per kWh of electricity generated.

In a specific example, the set of electricity provision parameters can include a power provision parameter (e.g., a supply schedule of power, such as through an expected supply curve, etc.), a power provision time parameter (e.g., power provision will start on month/day/year and hour/minutes, and end no later than month/day/year and hour/minutes; etc.), an ecological footprint characteristic (e.g., delivered power will have a specific carbon footprint of Z $gCO_2$/kWh, etc.), a price parameter (e.g., the price per kWh hour will be $Q per kWh, with a reservation price of $P per kWh, etc.); and/or any other suitable electricity provision parameters.

Collecting a set of electricity provision parameters is preferably performed at a providing party interface (e.g., presented at and/or otherwise associated with a providing party device such as a personal computing device; configured to communicate with a centralized services system such as to communicate electricity provision parameters, suitable inputs, and/or other suitable data to the centralized services system and/or other suitable components; etc.), but can be performed at any suitable component. The providing party interface preferably includes a graphical user interface (e.g., presented through an application executable on a providing party device, etc.), but can include any suitable interfaces.

However, collecting the set of electricity provision parameters can be performed in any suitable manner.

3.2 Collecting Electricity Request Parameters

Embodiments of the method 100 can include collecting a set of electricity request parameters from a receiving party S120, which can function to determine data associated with (e.g., informative of; descriptive of; etc.) potential and/or actual electricity reception by one or more receiving parties.

Receiving parties can include any one or more of: electricity buyers, electricity consumers, businesses, individuals, governments, other organizations, energy storage entities, and/or any other suitable types of entities associated with electricity reception.

Electricity request parameters can include any one or more of: ecological footprint request characteristics (e.g., a maximum carbon footprint per unit of power to be consumed; a maximum total carbon footprint associated with power consumption by the receiving party; carbon footprint grade parameters; preferences for energy source type and/or other energy source characteristics; energy consumption profile preferences; preferences for any suitable ecological footprint characteristics; etc.); electricity reception parameters (e.g., a power reception parameter such as describing an requested amount of power reception in kWh; an energy reception parameter such as describing an amount of requested energy reception in kW; an electricity reception parameter corresponding to satisfaction of a target condition and/or threshold condition; etc.); electricity reception time parameters (e.g., a reception time parameter such as describing a time period for which an amount of electricity will be received and/or power will be received, such as at the rate described by a power reception parameter; etc.); payment parameters (e.g., describing a monetary amount and/or range of monetary amounts that a receiving party is willing to pay for electricity, such as a payment parameter corresponding to a power reception parameter and/or a power reception time parameter; etc.); identifiers (e.g., identifying receiving parties; etc.); receiving party data (e.g., type of receiving party; location of receiving party; historic electricity reception data such as informative of an electricity consumption profile and/or electricity reception profile for the receiving party; historic electricity services transactions; historic electricity request parameters; etc.); liability restriction condition preferences; and/or any other suitable parameters associated with electricity reception.

In a specific example, the set of electricity request parameters can include a first power reception parameter (e.g., power shall be received at a maximum of X kWh and a minimum of Y kWh); a second power reception parameter (e.g., power shall be received until one or more target conditions are satisfied, such as a battery state of charge, a quantity of hydrogen produced, water temperature, volume of compressed natural gas, and/or other suitable target conditions; etc.); a power reception time parameter (e.g., power reception will start on month/day/year and hour/minutes, and end no later than month/day/year and hour/minutes; etc.); an ecological footprint request characteristic (e.g., received power will have an average specific carbon footprint of Z $gCO_2$/kWh, and will not exceed W $gCO_2$/kWh; etc.); a payment parameter (e.g., a maximum monetary amount willing to be paid per kWh hour such as in terms of monetary amount per kWh; etc.); and/or any other suitable electricity request parameters.

Any suitable number of electricity request parameters can be collected at any suitable time and frequency. In an example, collecting the set of electricity request parameters can be performed in response to presenting one or more price parameters (e.g., quotes for electricity, such as determined based on one or more price parameters collected from a providing party; etc.), such as at a receiving party interface.

Collecting electricity request parameters is preferably performed at a receiving party interface (e.g., presented at and/or otherwise associated with a receiving party device; configured to communicate with a centralized services system such as to communicate electricity request parameters, suitable inputs, and/or other suitable data to the centralized services system and/or other suitable components; etc.), but can be performed at any suitable component. The receiving party interface preferably includes a graphical user interface (e.g., presented through an application executable on a receiving party device, etc.), but can include any suitable interfaces.

However, collecting the set of electricity request parameters can be performed in any suitable manner.

3.3 Determining a Services Match

Embodiments of the method 100 can include determining a services match (e.g., exchange match; ancillary services match; etc.) between one or more providing parties and one or more receiving parties based on a set of electricity provision parameters (e.g., one or more electricity provision parameters) and a set of electricity request parameters (e.g., one or more electricity request parameters) S130, which can function to match one or more receiving parties and one or more providing parties for purposes of facilitating electricity services (e.g., electricity exchange; etc.).

Determining a services match can include any one or more of matching, pairing, grouping, joining, combining, arranging, organizing, and/or otherwise associating one or more receiving parties and one or more providing parties. Any number of services matches can be determined (e.g., in parallel for a plurality of services matches; serially; at any time and frequency; etc.) for any number of receiving parties and providing parties (e.g., in any numerical relationship between receiving parties and providing parties). In an example, a services match can be determined between a receiving party and a plurality of providing parties (e.g., where the plurality of providing parties provides power in a form sufficient to meet the electricity request parameters of the receiving party). In an example, a services match can be determined between a plurality of receiving parties and a providing party (e.g., where the providing party provides power in a form sufficient to meet the electricity request parameters of each of the plurality of receiving parties; etc.). In a specific example, determining a services match can include determining a services match for a receiving party (e.g., a receiving party of a first type, etc.) independent of an ecological footprint request characteristic (e.g., determining a services match based on a minimizing expenditure for the amount of requested electricity, without consideration of ecological footprint request characteristics, etc.). In a specific example, determining a services match can include determining a services match for a receiving party (e.g., a receiving party of a second type, etc.) based on an ecological footprint request characteristic and a payment parameter (e.g., minimizing expenditure while accommodating one or more ecological footprint request characteristics; "I request 1 kWh with an average carbon footprint of 1 $gCO_2/kW$ at the lowest price"; etc.). However, services matches between receiving parties and providing parties can have any suitable numerical relationship for any suitable types of receiving parties and providing parties.

Determining a services match is preferably based on one or more electricity request parameters (e.g., collected from one or more receiving parties; etc.) and one or more electricity provision parameters (e.g., collected from one or more providing parties; etc.), such as where determining a services match is based on identifying one or more providing parties corresponding to electricity provision parameters satisfying the receiving party preferences described by the one or more electricity request parameters. In examples, determining a services match can additionally or alternatively be based on electricity delivery costs (e.g., infrastructure use costs, local congestion costs, other location-based costs, time-based costs, tariff-based costs, costs associated with distance between one or more providing parties and one or more receiving parties, etc.); optimization parameters (e.g., price optimization parameters for optimizing price, such as in the context of satisfying other conditions; ecological footprint characteristic optimization parameters for optimizing ecological footprint characteristics, such as in the context of satisfying other conditions; etc.); bids (e.g., where electricity being sold is sold to the highest bidder; etc.); receiving party data (e.g., energy-behavioral patterns, associated with energy reception by receiving parties at a macro-temporal scale, at a micro-temporal scale; patterns based on historical data, such as historical power consumption patterns, historical electricity services transactions; outputs from associated predictive models; type of receiving party; legal requirements associated with the receiving party; etc.); providing party data (e.g., energy-behavioral patterns associated with energy provision and/or energy consumption by providing parties at a macro-temporal scale, at a micro-temporal scale; patterns associated with surplus energy generation, such as based on the difference between power output from a DER and providing party power consumption; patterns based on historical data, such as historical power provision patterns, historical electricity services transactions; outputs from associated predictive models; type of providing party; legal requirements associated with the providing party; etc.); energy device data (e.g., power output data and/or other suitable data associated with DERs such as photovoltaic arrays, and/or from any other energy sources; outputs from associated predictive models, such as models accounting for local ambient conditions such as cloud coverage and temperature; etc.); and/or any other suitable data.

In a variation, determining a services match (e.g., an exchange match for electricity exchange; etc.) can include determining an electricity services feasibility (e.g., determining the physical feasibility of electricity exchange and/or suitable electricity-related services between one or more providing parties and one or more receiving parties, such as according to corresponding electricity provision parameters and electricity request parameters; etc.). In an example, determining an electricity services feasibility can include: determining an electricity services feasibility based on utility entity data (e.g., advanced distribution management system (ADMS) data associated with one or more utility entities; data describing capabilities of physical wires through which electricity will be transferred; etc.); electricity provision parameters associated with a services match (e.g., amount of electricity to be provided over a time period; amount of power to be provided over a time period; etc.); electricity request parameters associated with a services match; and/or other suitable data. In an example, ADMS data, other utility entity data, device data, and/or other suitable data can be used in determining (e.g., optimizing, etc.) electricity delivery costs (e.g., using data regarding grid congestion; etc.), such as for determining price parameters (e.g., with improved accuracy), determining consumption pattern recommendations (e.g., recommending electricity consumption in response to lower than average electricity delivery costs; etc.), and/or for any suitable purpose. In specific examples, determining an electricity services feasibility can be for a per-match basis (e.g., for individual services matches such as every services match; for individual exchange matches such as every exchange match, such as for evaluating the feasibility of electricity exchange; etc.) and/or per-transaction basis (e.g., for individual electricity services transactions such as every electricity services transaction; for individual electricity exchanges transactions such as every electricity exchange transaction; etc.), such as in real-time. In a specific example, the method 100 can include; in response to determining an electricity services feasibility satisfying a condition (e.g., below a threshold condition; indicating lack of feasibility; etc.), determining a substitute services match; re-evaluating previous services matches; leveraging the data (e.g., ADMS data, etc.) for determining subsequent services matches; and/or performing any suitable portions of embodiments of the method 100. However, determining electricity services feasibility can be performed in any suitable manner.

In a variation, determining services matches (e.g., an exchange match for electricity exchange; etc.) and/or suitable portions of embodiments of the method 100 can be based on grid balancing parameters (e.g., associated with grid balancing for maintaining, informing, and/or otherwise facilitating the physical feasibility of electricity exchange associated with an electrical grid, etc.). Grid balancing parameters can include one or more of: costs of grid balancing (e.g., costs by a DSO system and/or other suitable party for performing processes for maintaining grid balance; costs associated with determining and/or sending price signals to DERs and/or suitable providing parties, such as for voltage, var, frequency and/or suitable electricity parameters associated with grid balancing; costs of suitable ancillary services support; a monetary amount; etc.); cost sharing parameters (e.g., associated with distribution of costs across transactions associated with the particular distribution grid, regions of a distribution grid, multiple distribution grids, with any suitable regions and/or entities; etc.); grid balancing electricity parameters (e.g., voltage, var, frequency, such as associated with a distribution grid region for grid balancing, etc.); and/or other suitable parameters. In a specific example, determining services matches (and/or responses by DERs and/or suitable providing parties) can be based on feasibility of a corresponding electricity exchange (e.g., corresponding to grid balancing parameters determined by a DSO and/or suitable entity; corresponding to parameters evaluated for the potential services match such as for the potential exchange match; etc.) and associated costs (e.g., price in a price signal from a DSO satisfies the DER's preference; etc.), such as where a services match and/or response by a providing party can only be established in response to sufficient physical feasibility and costs (e.g., satisfying one or more threshold conditions; etc.). In a specific example, each services match and/or electricity services transaction (e.g., electricity exchange transaction) can be assumed to be physically feasible, such as where associated grid balancing costs can be shared across a plurality of parties. In a specific example, grid balancing costs can be shared across receiving parties (e.g., residential, commercial, factories, etc.) associated with a distribution grid (e.g., a region of the distribution grid corresponding to the grid balancing costs; etc.), such as in amounts proportional to the amount of total kWhs consumed by the different receiving parties; across providing parties; and/or across any suitable parties in any suitable manner. However, grid balancing parameters can be used in relation to determining services matches and/or performing suitable portions of embodiments of the method 100 in any suitable manner.

Determining one or more services matches can be performed with one or more services match models (e.g., exchange match models, such as for determining exchange matches for electricity exchange; etc.), which can include any one or more of matching models (e.g., where outputs include one or more services matches between one or more receiving parties and one or more providing parties; etc.); ecological footprint models (e.g., for determining ecological footprint characteristics, such as for a time period, time point, and/or other temporal indicator; models for determining specific carbon footprints; etc.); receiving party models (e.g., predictive models for predicting energy-behavioral patterns and/or associated data; etc.); providing party models (e.g., predictive models for predicting energy-behavioral patterns and/or associated data; etc.); energy device models (e.g., predictive models for predicting power output over time for different energy devices and/or other suitable energy sources; etc.); and/or any other suitable models.

In examples, models (e.g., services match models, etc.) and/or other suitable components and/or any suitable portions of the method 100 can apply artificial intelligence approaches (e.g., machine learning approaches, etc.) including any one or more of: supervised learning (e.g., using logistic regression, using back propagation neural networks, using random forests, decision trees, etc.), unsupervised learning (e.g., using an Apriori algorithm, using K-means clustering), semi-supervised learning, a deep learning algorithm (e.g., neural networks, a restricted Boltzmann machine, a deep belief network method, a convolutional neural network method, a recurrent neural network method, stacked auto-encoder method, etc.) reinforcement learning (e.g., using a Q-learning algorithm, using temporal difference learning), a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable artificial intelligence approach.

In examples, determining one or more services matches and/or any suitable portions of the method 100 can include extracting features (e.g., for generating, executing, applying, updating, and/or otherwise processing models, etc.), performing pattern recognition on data, fusing data from multiple sources, combination of values (e.g., averaging values, etc.), compression, conversion (e.g., digital-to-analog conversion, analog-to-digital conversion), performing statistical estimation on data (e.g. ordinary least squares regression, non-negative least squares regression, principal components analysis, ridge regression, etc.), wave modulation, normalization, updating, ranking, weighting, validating, filtering (e.g., for baseline correction, data cropping, etc.), noise reduction, smoothing, filling (e.g., gap filling), aligning, model fitting, binning, windowing, clipping, transformations, mathematical operations (e.g., derivatives, moving averages, summing, subtracting, multiplying, dividing, etc.), data association, multiplexing, demultiplexing, interpolating, extrapolating, clustering, signal processing operations, visualizing, and/or any other suitable processing operations.

Determining one or more services matches is preferably performed at (e.g., with) one or more centralized services systems and/or other suitable centralized computing systems, but can additionally or alternatively be performed at one or more decentralized network systems, and/or at any suitable components.

However, determining one or more services matches can be performed in any suitable manner.

3.3. A Determining a Selective Sourcing Services Match

Determining one or more services matches can include determining one or more selective sourcing (e.g., "carbon grading", etc.) services matches (e.g., selective sourcing exchange matches; etc.) S135, which can function to match one or more receiving parties and one or more providing parties based on ecological footprint characteristics associated with electricity services. For example, determining a selective sourcing services match can include determining a services match based on one or more ecological footprint request characteristics (e.g., requesting a maximum carbon footprint per unit of power to be consumed; a maximum total carbon footprint associated with power consumption by the receiving party; etc.) and one or more ecological footprint characteristics associated with the one or more providing parties (e.g., specific carbon footprint associated with power provision by the one or more providing parties; etc.). Determining selective sourcing services matches can enable tracking and traceability (e.g., through the use of one or more decentralized network systems) for ecological footprint aspects of electricity services transactions.

Determining a selective sourcing services match can include determining a services match between a receiving party and a providing party (e.g., where the providing party can satisfy the electricity reception parameters requested by the receiving party while satisfying the ecological characteristic request parameters and/or other suitable parameters); between a receiving party and a plurality of providing parties (e.g., where an ecological footprint profile, such as including electricity from a plurality of energy source types, can be determined for the receiving party based on the ecological footprint characteristics associated with power provision from the plurality of providing parties; such as where the ecological footprint profile can satisfy ecological footprint request characteristics provided by the receiving party, while minimizing expenditure by the receiving party; etc.); between a plurality of receiving parties and a providing party (e.g., where the providing party can provide electricity to the plurality of receiving parties while satisfying ecological footprint request characteristics for the receiving parties and/or other associated electricity request parameters; etc.); and/or for any suitable numerical relationship between receiving parties and providing parties.

In an example, the method 100 can include determining one or more services matches between the receiving party and a plurality of providing parties (e.g., where a single services match can be determined between the receiving party and the plurality of providing parties; where a plurality of services matches, such as pairings, can be determined between the receiving party and the plurality of providing parties; etc.) based on one or more ecological footprint request characteristics (e.g., from the receiving party; etc.) and a plurality of ecological footprint characteristics associated with power provision by the plurality of providing parties; processing (e.g., with a decentralized network system, etc.) an electricity services transaction based on the services match between the receiving party and the plurality of providing parties; and dynamically facilitating electricity services between the receiving party and the plurality of providing parties based on the electricity services transaction. In an example determining a services match between a receiving party and a plurality of providing parties can include determining an ecological footprint profile based on the ecological footprint request characteristic and the plurality of ecological footprint characteristics, where the ecological footprint profile can include a plurality of energy source types associated with the power provision by the plurality of providing parties; where processing an electricity services transaction based on the services match can include updating the ecological footprint profile based on the dynamically facilitated electricity services (e.g., based on the actual electricity provided and actual electricity consumed, and/or associated ecological footprint characteristics; etc.); and recording the updated ecological footprint profile at a distributed ledger of a decentralized network system.

In a specific example, determining a selective sourcing services match can include determining, for a receiving party, an ecological footprint profile including energy associated with a plurality of energy source types including solar energy, natural gas, and/or other sources, such as where the energy is weighted in relation to energy source type based on one or more electricity request parameters (e.g., for satisfying one or more ecological footprint request characteristics; for satisfying payment parameters while satisfying an ecological footprint request characteristic; etc.). In a specific example, determining a selective sourcing services match can include determining, for a receiving party, an ecological footprint profile including 20% solar energy, 15% wind energy, 42% nuclear power plant A, 13% nuclear power plant D, and 10% coal power plant E. In a specific example, determining a selective sourcing services match can be based on a set of electricity request parameters including an electricity reception parameter (e.g., a daily energy demand of 12 kWh, etc.), a payment parameter (e.g., a maximum total gross expenditure of $2.00), and one or more ecological footprint request characteristics (e.g., mean carbon footprint per unit of 0 $gCO_2$/kWh; total carbon footprint of 0 $gCO_2$/kWh; etc.). In a specific example, determining a selective sourcing services match can include determining a services match based on a set of electricity provision parameters (e.g., including a power provision parameter, a power provision time parameter, a price parameter, and/or other suitable parameters; etc.) and on a set of electricity request parameters (e.g., including a power reception parameter, a power reception time parameter, a payment parameter, and/or other suitable parameters; etc.).

Determining one or more selective sourcing services matches is preferably performed in response to collecting one or more ecological footprint request characteristics (e.g., a selection to participate in selective sourcing services matching; requests for specific values of ecological footprint characteristics associated with provided power; etc.) and/or associated payment (e.g., one or more tokens associated with one or more decentralized network systems; other monetary currency; etc.), but can additionally or alternatively be performed in temporal relation to any suitable processes (e.g., portions of the method 100; serially; in parallel; etc.), and/or at any suitable time and frequency.

Determining one or more selective sourcing services matches can be based on one or more specific carbon footprints. As such, determining a selective sourcing services match (and/or other suitable portions of the method 100) can additionally or alternatively include determining one or more specific carbon footprints (and/or other suitable ecological footprint characteristics associated with electricity to be provided, such as whether through one or more providing parties and/or through grid power provision without a services match, etc.). Determining specific carbon footprints can include determining specific carbon footprint over time (e.g., where the specific carbon footprint varies over time; etc.); specific carbon footprints for electricity provision by one or more providing parties; specific carbon footprints for electricity provision by an electrical grid (e.g., a distribution grid; electricity provision independent from a services match; electricity provision without selective sourcing; etc.); and/or any other suitable types of specific carbon footprints.

Determining a specific carbon footprint can be based on any one or more of electricity mix for a service territory (e.g., at a point in time; based on location of the receiving party; based on location of the providing party; etc.); storage source characteristics (e.g., types of storage sources; energy used to operate a storage source, such as hydrogen fueling a fuel cell being produced by a combination of different processes associated with different specific carbon footprints; etc.); temporal indicators (e.g., where specific carbon footprint varies over time; such as combined heat and power natural gas generators being associated with efficiency curves describing efficiency variance with operation conditions such as rpm, where lower efficiency can indicate more natural gas is combusted and more carbon is emitted to generate a unit of electricity; etc.); and/or any other suitable data (e.g., data described herein, etc.).

Determining one or more selective sourcing services matches preferably includes determining one or more services matches based on one or more carbon mitigation parameters (and/or one or more ecological footprint characteristics, ecological footprint request characteristics, and/or any other suitable parameters). Carbon mitigation parameters can be associated with (e.g., describe, indicate, inform, etc.) a relative carbon benefit corresponding to power provision to one or more receiving parties by one or more providing parties (e.g., where the relative carbon benefit is associated with relative ecological footprint value from participating in a selective sourcing services match over the ecological footprint value from not participating in a selective sourcing services match, such as through consuming electricity offered by a utility independent of the selective sourcing services match, etc.). In a specific example, price parameters associated with a services match, electricity services transaction, and/or other suitable component can be based on a carbon mitigation parameter (e.g., where electricity price reflects relative carbon benefit, etc.). Carbon mitigation parameters can be a relative carbon benefit for each kWh of electricity consumed, and/or can be described with any suitable units and/or forms. Determining carbon mitigation parameters is preferably based on one or more specific carbon footprints, but can additionally or alternatively be based on other suitable ecological footprint characteristics and/or any other suitable data. In an example, determining a carbon mitigation parameter can include determining a first specific carbon footprint for grid power provision to the receiving party by an electrical grid (e.g., independent from participation in a selective sourcing services match; etc.); determining a second specific carbon footprint for the power provision to the receiving by the providing party (e.g., in association with a selective sourcing services match and/or selective sourcing transaction; etc.); and determining one or more carbon mitigation parameters based on the first and the second specific carbon footprints (e.g., a difference between the first and second specific carbon footprints; indicating the relative carbon benefit; etc.). In an example, determining a first specific carbon footprint (e.g., for grid power provision; etc.) can include determining a first specific carbon footprint over time (e.g., where the specific carbon footprint values vary over time; etc.) based on a time period associated with the electricity services transaction (e.g., based on an electricity reception time parameter indicating the time period for which power will be received in association with the electricity services transaction, etc.) and/or on a first location associated with the receiving party (e.g., where specific carbon footprint for the grid power provision can be based on location of the receiving party; etc.); where determining a second specific carbon footprint (e.g., for power provision by the providing party; etc.) can include determining a second specific carbon footprint over time based on the time period and on a second location associated with the providing party (e.g., where specific carbon footprint for the providing party power provision can be based on location of the providing party; etc.); and where determining one or more carbon mitigation parameters can be based on the first and the second specific carbon footprints over time.

Additionally or alternatively, any suitable processes described in relation to specific carbon footprints, carbon mitigation parameters, and/or associated selective sourcing services matches can be analogously performed in relation to other suitable types of ecological footprint characteristics. However, determining specific carbon footprints, carbon mitigation parameters, and/or associated selective sourcing services matches can be performed in any suitable manner.

Determining one or more selective sourcing services matches is preferably based on one or more ecological characteristic request parameters (e.g., a carbon budget specified by a receiving party). In an example, determining a selective sourcing services match can include minimizing one or more receiving parties' expenditures, subject to one or more electricity reception parameters (e.g., utility constraint of an amount of electricity that a user requests and/or agrees to use over a given time period; etc.), and one or more payment parameters (e.g., a monetary amount budget; etc.) and one or more ecological characteristic request parameters (e.g., a carbon budget, such as a maximum carbon footprint associated with the utility constraint, etc.). Additionally or alternatively, determining selective sourcing services matches can be based on any suitable data.

Determining one or more selective sourcing services matches preferably includes analyzing a plurality of receiving parties and a plurality of providing parties (e.g., simultaneously; every participating receiving party and providing party; a subset of receiving parties and providing parties; etc.), such as to facilitate determinations of optimal solutions for the selective sourcing services matches (e.g., in relation to satisfying electricity request parameters and/or electricity provision parameters; etc.). However, any suitable number of receiving parties and/or providing parties can be analyzed (e.g., in parallel; serially; etc.) for determining one or more selective sourcing services matches.

Determining a selective sourcing services match can be based on minimizing expenditure while accommodating electricity reception parameters (e.g., electricity consumption budget; etc.) and ecological footprint request characteristics (e.g., carbon budget; etc.). In specific examples, minimizing such an expenditure can include solving a base problem (and/or analogous problems) including:

At each time interval t, components include:

Sellers (e.g., and/or other providing parties; etc.): 1, 2, ..., i, ..., I, where by default seller 1 includes the utility entity Sellers' unit prices (e.g., and/or other price parameters; etc.): $p_{s1}, p_{s2}, \ldots, p_{si}, \ldots, p_{sI}$ Sellers' volumes (e.g., and/or capacity and/or other electricity parameters; etc.): $v_{s1}, v_{s2}, \ldots, v_{si}, \ldots, v_{sI}$ Sellers' specific carbon footprints (e.g., and/or other ecological footprint characteristics; etc.): $s_{s1}, s_{s2}, \ldots, s_{si}, \ldots, s_{sI}$ Buyers (e.g., and/or other receiving parties; etc.): 1, 2, ..., j, ..., J, where by default buyer 1 includes the entity Buyers' reservation prices (e.g., and/or requested delivery rate and/or other payment parameters; etc.): $p_{b1}, p_{b2}, \ldots, p_{bj}, \ldots, p_{bJ}$ (e.g., where such can be unnecessary)

Buyers' volumes (e.g., and/or other electricity reception parameters; etc.): $v_{b1}, v_{b2}, \ldots, v_{bj}, \ldots, v_{bJ}$ Buyers' carbon budgets (e.g., and/or other ecological footprint request characteristics; etc.): $c_{b1}, c_{b2}, \ldots, c_{bj}, \ldots, c_{bJ}$ For buyer j, the expenditure function can include:

$$E_j = v_{j1}p_{s1} + \ldots + v_{ji}p_{si} + \ldots + v_{jI}p_{sI} \quad (1)$$

$$\mathrm{argmin}(E_j) \quad (2)$$

subject to:

$$v_{j1}s_1 + \ldots + v_{ji}s_i + \ldots + v_{jI}s_I \leq c_j \quad (3)$$

$$v_{j1} + \ldots + v_{ji} + \ldots + v_{jI} = v_{bj} \quad (4)$$

$$v_{ji} \leq v_{si} \quad (5)$$

The constraint (3) can indicate that receiving parties' ecological footprint request characteristics (e.g., carbon preferences; etc.) can be satisfied with a profile (e.g., portfolio) of power from different assets (e.g., energy source types, etc.). Including the utility entity in the set of participants can enable the assumption that buyer j purchases exactly the amount $v_{bj}$ (i.e. the purchase does not have to be contingent on any explicit constraint on price or specific carbon footprint of the available electricity). Including the utility entity in the set of suppliers can enable not needing to include a constraint on the expenditure. Given that a receiving party will consume a set amount of electricity, the receiving party can purchase DERs from the utility, or a combination of sellers, based on whichever minimizes expenditure. Such analyses can be applicable to situations where receiving parties do not adjust electricity consumption based on real time price; can be extended to accommodate situations where buyers adjust consumption based on real time price and/or ecological footprint characteristics, which can be applicable to flexible loads and speculative storage (e.g., arbitrage). Such extensions can include constraints on demand, to reflect the minimum volumes that buyers need to meet their needs. For example, the management of lighting systems can mitigate expenditure but it is subject to the minimum lighting needs. Similarly, the charging of electric vehicles can be managed to mitigate expenditures or carbon emissions, but receiving parties can have preferences on the amount of energy that needs to be stored in the onboard battery by a given time. Extensions can also include expanding analyses to a general situation when multiple buyers (e.g., and/or other receiving parties; etc.) are present.

Determining one or more selective sourcing services matches can be performed with one or more services match models. Different services match models (e.g., applying different algorithms; using different sets of features; associated with different input and/or output types; applied in different manners such as in relation to time, frequency, component applying the model; generated with different approaches; etc.) can be generated, selected, retrieved, executed, applied, and/or otherwise processed for different purposes. For example, different services match models can be applied in determining a services match without selective sourcing (e.g., without consideration of ecological footprint request characteristics and/or ecological footprint characteristics; etc.) versus a selective sourcing services match. In a specific example, the method 100 can include determining, with a first services match model, a services match (e.g., a selective sourcing services match), such as based on a carbon mitigation parameter, an ecological footprint characteristic and an ecological footprint request characteristic; and determining, with a second services match model, an additional services match (e.g., a services match without selective sourcing, etc.), such as based on a price parameter and a payment parameter.

In variations, determining selective sourcing services matches (and/or other suitable portions of the method 100) can include processing one or more tokens associated with one or more decentralized network systems). Tokens can correspond to any suitable functionality associated with portions of the method 100, such as including one or more of: access to selective sourcing services matches (e.g., along with associated components such as selective sourcing transactions, dynamically facilitated electricity services based on selective sourcing transactions; where a token can correspond to access to selective sourcing of an amount associated with an ecological footprint characteristic, such as an amount of kWh via a specified carbon footprint level; etc.); services for electricity (e.g., corresponding to one or more electricity reception parameters; corresponding to an amount of energy and/or power provision; etc.); substitute for certificates (e.g., substitute for renewable energy certificates; where tokens can act as a transparent and secure means of reflecting electricity services transactions; etc.); conversion for carbon credits (e.g., conversion for permits allowing an amount of carbon emissions; etc.); and/or used for any suitable purpose (e.g., transactional purposes, recording purposes, etc.) associated with the method 100 and/or system 200. For example, determining a selective sourcing services match can be performed in response to collecting one or more tokens (e.g., "Eden" tokens associated with an Ethereum blockchain system, "Eden" tokens and/or suitable tokens supported by a consortium blockchain system, such as the blockchain system used for accounting for electricity services transactions, "Eden" tokens and/or suitable tokens supported by any suitable component of embodiments of the system 200; etc.) associated with access to participation in a selective sourcing services match.

Selective sourcing services matches can be used as a basis for selective sourcing transactions (e.g., a type of electricity services transaction, where ecological footprint characteristics are considered and accounted for; etc.), where any suitable aspects associated with selective sourcing can be performed by, at, with, and/or can otherwise be related to one or more decentralized network systems. For example, token processing (e.g., for accessing selective sourcing aspects; etc.), recording of selective sourcing transactions and/or selective sourcing services matches, and/or other aspects associated with selective sourcing can be performed with a first decentralized network system, which can be different from a second decentralized network system used in facilitating aspects of electricity services transactions independent from selective sourcing, or can be the same as the second decentralized network system (e.g., the same decentralized network system used in facilitating selective sourcing aspects and other aspects of electricity services transactions; etc.). In a specific example, determining a services match can include determining an amount in tokens for payment for selective sourcing access; and determining an amount in a different monetary currency for payment of the energy associated with selective sourcing services match.

In a variation, a token (and/or other suitable component) can correspond to an amount of carbon mitigation value (e.g., relative carbon benefit; corresponding to a carbon mitigation parameter; etc.), such as 1 ton CO2e per unit. In an example, a set of carbon mitigation tokens can correspond to an amount of carbon mitigation associated with one or more electricity services transactions (e.g., where the carbon mitigation tokens can be used in any suitable portions of the method 100, such as with processing an electricity services transaction; etc.). In a specific example, for a valuation of 1 ton of CO2e at $10, a token (e.g., one "Eden" token) can correspond to an approximate maximum valuation of $10, and the token can be used for a carbon mitigation (e.g., mitigation of carbon emissions, etc.) by up to 1 ton in that market; where if a specific carbon footprint of electricity in the market is on average 0.5 kg/kWh, a receiving entity (e.g., a commercial participant, industrial participant, residential participant, etc.) can use the token to source approximately 2,000 kWh (i.e., where 1,000 kg/0.5 kg/kWh=2,000 kWh) of zero-carbon electricity. Alternatively, selective sourcing aspects can be implemented without using tokens. Additionally or alternatively, processing tokens can be performed in any suitable manner. However, determining one or more selective sourcing services matches can be performed in any suitable manner.

3.4 Processing an Electricity Services Transaction

Embodiments of the method 100 can include processing an electricity services transaction based on the services match between the one or more providing parties and the one or more receiving parties S140, which can function to determine, execute, record, update and/or otherwise process electricity services transactions; determine, fulfill, record, update, and/or otherwise process balances associated with participating entities (e.g., receiving parties, providing parties, utility entities, etc.); and/or can include any suitable functionality.

Electricity services transactions can include any one or more of electricity exchange transactions, selective sourcing transactions (e.g., electricity exchange transactions including selective sourcing aspects, such as considerations based on ecological footprint request characteristics and/or ecological footprint characteristics; etc.); transactions including services of electricity, currency (e.g., tokens), carbon credits, and/or any other suitable components; electricity services transaction parameters (e.g., describing, informing, guiding, constraining, and/or otherwise associated with aspects of one or more electricity services transactions; etc.); and/or any other suitable components. Electricity services transaction parameters can include any one or more of: price parameters (e.g., describing a price for the electricity services transaction, such as an agreed-upon price between one or more receiving parties and one or more providing parties; categorized prices, such as a first price for actual cost of energy, and a second cost for electricity delivery based on transmission cost/loss, distribution cost/loss, and/or other suitable parameters; such as in amount of monetary currency per kWh; etc.); temporal parameters (e.g., electricity provision time parameters such as describing one or more time periods of power provision; electricity reception time parameters such as describing one or more time periods of power reception; timestamps associated with generation, execution, and/or completion of one or more electricity services transactions; timestamps associated with services matches; etc.); electricity provision parameters (e.g., ecological footprint characteristics associated with electricity provision corresponding to the electricity services transaction, such as specific carbon footprints associated with electricity provision, such as an associated average carbon footprint, such as energy source types associated with electricity provision; ecological footprint profiles; energy parameters describing the amount of energy and/or power to be provided and/or actually provided in accordance with the electricity services transaction; etc.); electricity request parameters (e.g., ecological footprint request characteristics; etc.); providing party data (e.g., providing party identifiers; providing party balances, such as in relation to monetary balance, tokens, credits, and/or other suitable balances; historical data; etc.); receiving party data (e.g., receiving party identifiers; receiving party balances, such as in relation to monetary balance, tokens, credits, and/or other suitable balances; historical data; etc.); utility entity data (e.g., utility entity balances, such as in relation to monetary balance, tokens, credits; historical data; etc.); energy device data (e.g., describing and/or otherwise associated with the physical electricity services; etc.); and/or any other suitable data.

Processing one or more electricity services transactions preferably includes recording one or more electricity services transaction parameters describing the one or more electricity services transactions. Recording the one or more electricity services transaction parameters and/or other suitable data is preferably performed with (e.g., at, via, by, etc.) one or more decentralized network systems. In an example, processing an electricity services transaction can include, with a decentralized network system, recording, at a distributed ledger including decentralized nodes of the decentralized network system, a set of electricity services transaction parameters of the electricity services transaction, where the set of electricity services transaction parameters includes a price parameter, an energy parameter, a providing party identifier, and a receiving party identifier; and updating, at the decentralized nodes, a providing party balance (e.g., monetary balance) and a receiving party balance (e.g., monetary balance) based on the set of electricity services transaction parameters (e.g., an amount of electricity provided by the providing party; an amount of electricity consumed by a receiving party; etc.). In an example, a token (e.g., crypto token associated with the decentralized network system) can trace paths of energy (e.g., record, reflect, correspond to, and/or otherwise be associated with electricity services transaction parameters, such as by tracing the path of the token through different electricity services transactions; etc.), such as thereby including functionality of serving as proof (e.g., "Proof of Purity", etc.) of the corresponding energy's ecological footprint characteristics (e.g., specific carbon footprint; etc.).

In an example, one or more decentralized network systems can include participants including any one or more of: providing parties, receiving parties, utility entities, power retailers, distribution owners, independent system operators, microgrid operators, power plants and/or other suitable entities. In a variation, recording the one or more electricity services transaction parameters and/or performing other suitable processes in processing one or more electricity services transactions can be performed with a consortium blockchain system (e.g., a permissioned network, where a majority of the network is required to agree to include a new participant; where participant identifies are known, auditable, traceable; etc.). In a specific example, the decentralized network system can include a tokenless consortium blockchain system including a distributed ledger, where recording a set of electricity services transaction parameters can include recording the set of electricity services transaction parameters with the tokenless consortium blockchain system, and where updating a providing party balance and a receiving party balance can include updating the providing party balance and the receiving party balance with decentralized nodes of the tokenless consortium blockchain system.

In a variation, processing an electricity services transaction and/or performing other suitable portions of the method 100 can be performed with (e.g., at, via, by, etc.) a plurality of decentralized network systems (e.g., of different types). For example, a first decentralized network system (e.g., a consortium blockchain system) can perform processes associated with determining, recording, and/or otherwise processing aspects of electricity services transactions associated with underlying electricity services, and a second decentralized network system (e.g., an Ethereum blockchain system, etc.) can perform processes associated with aspects of selective sourcing (e.g., processing tokens associated with selective sourcing access; etc.). In a specific example, processing one or more electricity services transactions can include processing, with a second decentralized network system (e.g., an Ethereum blockchain system, etc.) configured to communicate with a first decentralized network system (e.g., a consortium blockchain system, etc.), a selective sourcing transaction based on a token associated with the second decentralized network system (e.g., processing a selective sourcing transaction for providing selective sourcing access to a receiving party, such as in services for a corresponding amount of tokens; etc.); determining, with the first decentralized network system, a verification of the selective sourcing transaction (e.g., verification of a transaction signature associated with the selective sourcing transaction; verification of communications received from the second decentralized network system and associated with the selective sourcing transaction; etc.); and processing, with the first decentralized network system, the electricity services transaction (e.g., recording electricity services transaction parameters; determining, executing, and/or otherwise processing a programmatic contract; etc.) based on the verification of the selective sourcing transaction and the services match between the providing party and the receiving party. However, any suitable distributions of functionality associated with any suitable portions of the method 100 can be distributed across any suitable number and type of decentralized network systems (and/or any suitable components of the system 200).

Processing one or more electricity services transactions can additionally or alternatively include determining, fulfilling (e.g., paying out), reconciling, updating, and/or otherwise processing one or more balances for one or more providing parties, receiving parties, utility entities, other participants, and/or other suitable entities. In an example, updating a providing party balance and a receiving party balance (e.g., a balance transfer from one or more receiving parties to one or more providing parties; etc.) can be performed in response to executing a programmatic contract (e.g., corresponding to the electricity services transaction; etc.).

Processing balances is preferably performed with a decentralized network system (e.g., the decentralized network system for recording electricity services transaction parameters; a different decentralized network system; where balances can be audited, verified; etc.), but can additionally or alternatively performed with a plurality of decentralized network systems and/or any with any suitable components. In an example, decentralized nodes of a decentralized network system can store, update, and/or otherwise process balances. In examples, fulfillment of balances (e.g., paying out of balances), can be performed at predetermined time intervals (e.g., periodically), in response to verification of physical electricity services (e.g., corresponding to the electricity services transaction; etc.), and/or at any suitable time and frequency.

Figure 5:
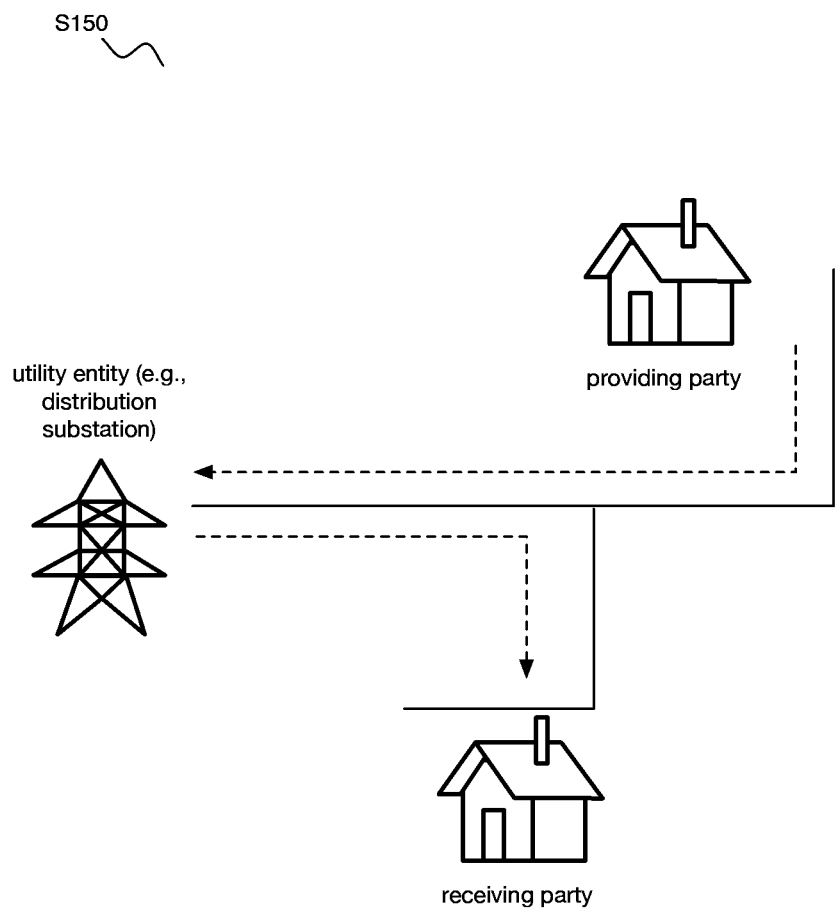
FIG. 5 includes a specific example of dynamically facilitating electricity services.
Figure 6:
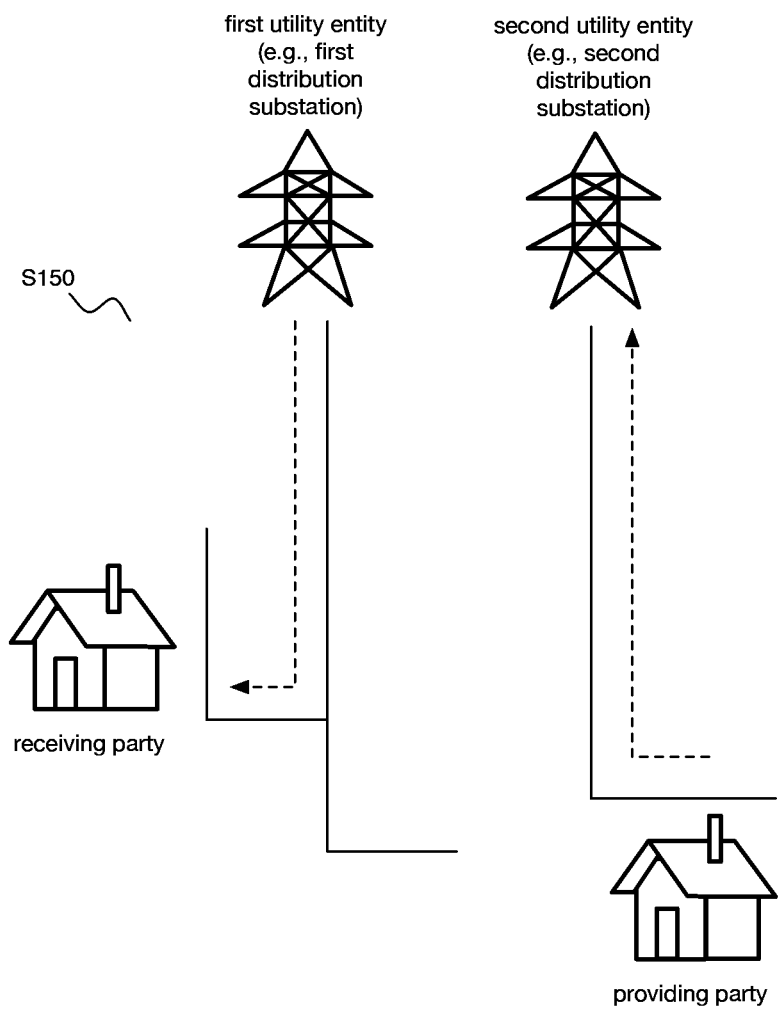
FIG. 6 includes a specific example of dynamically facilitating electricity services.

Processing balances can include processing utility entity balances (e.g., cross-utilities balance settlement; such as in real time; etc.), such as for electricity services transactions associated with one or more receiving parties and one or more providing parties in different locations (e.g., within a distribution grid; across different distribution grids; etc.). For example, an electricity services transaction can be associated with a receiving party at a first location (e.g., first location within a distribution grid; first region; first service area; etc.), a first utility entity at the first location (e.g., a first distribution substation at the first location; as shown in FIG. 6; etc.), a providing party at a second location (e.g., second location within the distribution grid; second region; second service area; etc.), and a second utility entity at the second location (e.g., a second distribution substation at the second location; as shown in FIG. 6; etc.), where the second utility entity receives electricity from the providing party, where the first utility entity provides electricity to the receiving party, and the method 100 can include updating the utility entity balances for the first and second utilities based on the respective electricity provision and electricity reception (e.g., settling debits/credits between the first and second utility entities; cross-utilities clearing; etc.). Additionally or alternatively, as shown in FIG. 5, electricity services transactions can be associated with a single utility entity (e.g., where providing parties provide electricity to the utility entity, and receiving parties receive electricity from the utility entity; etc.). However, processing utility entity balances can be performed in any suitable manner.

Processing one or more electricity services transactions can additionally or alternatively include determining, executing, facilitating, and/or otherwise processing one or more programmatic contracts (e.g., smart contracts; corresponding to one or more electricity services transactions; where programmatic contracts are included as part of the electricity services transaction; where programmatic contracts can include electricity services transaction parameters, such as for terms of the programmatic contracts; etc.). Processing programmatic contracts can function to execute one or more agreements (e.g., based on a services match; based on electricity provision parameters; based on electricity request parameters; etc.), such as in relation to electricity services, monetary transfer, and/or other suitable aspects, between one or more providing parties and one or more receiving parties, and/or between any suitable entities. In an example, a programmatic contract can be for $X per k/M/GWh for a duration of Y, but can include any suitable terms associated with any suitable aspects described herein.

In a variation, determining a programmatic contract can include automatically determining (e.g., automatically generating, etc.) a programmatic contract based on one or more services matches (e.g., in response to determining a services match, determining a programmatic contract based on the services match, such as based on the electricity provision parameters and electricity request parameters respectively corresponding to the providing party and the receiving party matched in the services match; etc.). In a specific example, a programmatic contract can be determined based on a services match between a providing party and a receiving party, such as where the services match was between only the providing party and the receiving party. In a specific example, a plurality of programmatic contracts can be determined based on a services match between one or more providing parties and one or more receiving parties, such as where a programmatic contract is determined for each pair of transacting parties. In a specific example, processing an electricity services transaction can include, in response to determining the services match, automatically determining a programmatic contract based on the set of electricity provision parameters and the set of electricity request parameters; and executing the programmatic contract (e.g., facilitating balance updates; performing processes associated with facilitating electricity services; etc.) with the decentralized network system configured to communicate with the centralized services system.

In a variation, determining a programmatic contract can be based on outputs from communications (e.g., facilitated through a communication platform, such as a platform accessible through receiving party interfaces and/or providing party interfaces; etc.) between one or more receiving parties and one or more providing parties. However, determining programmatic contracts can be performed in any suitable manner.

Processing one or more electricity services transactions can additionally or alternatively include determining, executing, facilitating, and/or otherwise processing one or more liability restriction conditions (e.g., describing the form in which liability will apply in relation to one or more electricity services transactions; based on liability restriction condition preferences received from a receiving party and/or providing party; etc.), such as where the liability restriction conditions can be integrated into one or more programmatic contracts (e.g., for guiding execution of an electricity services transaction that accounts for the liability restriction conditions). Liability restriction conditions can be associated with (e.g., impose, require, request, etc.) restriction of liability to deviation between electricity output (e.g., power output) of the providing party and electricity consumption (e.g., power consumption) of the receiving party, but can be associated with any suitable distribution of liability between any suitable entities. In examples, liability restriction conditions can include a default option such as a provider (e.g., providing party; etc.) of last resort (e.g., in geographic regions requiring power reliability satisfying one or more conditions; etc.). In specific examples, providers of last resorts can be determined, contracted to, assigned, and/or otherwise associated with one or more electricity services transactions (e.g., electricity exchange transactions, etc.) (and/or services matches, and/or other suitable components; etc.), such as where providers of last resort can provide the corresponding electricity services (e.g., the power contracted for; etc.) in response to failure of a providing party to provide the services. In a specific example, the providers of last resort can charge prices different from or the same as the failing providing party (e.g., where the failing providing party can be liable for the difference in prices charged; etc.). Providers of last resort can be distribution utility entities and/or any suitable types of providing parties. Different provider of last resort configurations can be established based on geographic regions (e.g., to accommodate different regulations associated with the different geographic regions; etc.). However, using providers of last resorts can be performed in any suitable manner.

In a variation, a liability restriction condition can be associated with a specified electricity output type (e.g., a specified power output type; corresponding to a programmatic contract for provision and reception of electricity of a specified output, etc.), such as where a receiving party is entitled to reception of the specified electricity output (e.g., specified in the programmatic contract, in the electricity services transaction; etc.), and the providing party is liable for costs associated with balancing electricity output deviations. In an example, processing an electricity services transaction can include determining a first liability restriction condition associated with restriction of liability for the electricity services transaction to deviation between power output of a providing party and power consumption of a receiving party; where dynamically facilitating electricity services can include determining the power output of the providing party; and where the method 100 can further include updating the electricity services transaction based on the liability restriction condition and the power output of the providing party (e.g., updating a providing party balance to account for deviations between specified power output and actual power output; etc.). However, processing liability restriction conditions associated with a specified electricity output can be performed in any suitable manner.

In a variation, a liability restriction condition can be associated with an expected electricity output type (e.g., an expected power output type; corresponding to a programmatic contract for provision and reception of electricity of an expected output, etc.), such as where a corresponding electricity services transaction (e.g., a corresponding programmatic contract) acknowledges risk of deviation of electricity output (e.g., such as by incorporating the risk into the associated price parameter; etc.). In an example, the parameters describing (e.g., forecasting overall trends; quantifying volatility; etc.) expected electricity output can be determined (e.g., through portions of the method 100; received from a third party; etc.), and used for determining corresponding price parameters and/or for other suitable purposes. In a specific example, the method 100 can include determining a liability restriction condition (e.g., where any number of liability restriction conditions associated with specified electricity output, expected electricity output, and/or other suitable parameters can be determined and/or processed for any number of electricity services transactions; where the liability condition includes a second liability restriction condition, where a first liability restriction condition for a first electricity services transaction is associated with a specified power output type; etc.) associated with an expected power output type and agreement upon an expected power output of a providing party (e.g., an additional providing party distinct from a providing part of the first electricity services transaction; etc.); determining the expected power output of the providing party; determining a price parameter based on the liability restriction condition and the expected power output; and processing, with the decentralized network system, the electricity services transaction (e.g., a second electricity services transaction; etc.) based on the liability restriction condition, the expected power output, and the price parameter (e.g., updating balances; recording corresponding electricity services transaction parameters; etc.). However, processing liability restriction conditions associated with an expected power output type, and/or otherwise processing liability restriction conditions, can be performed in any suitable manner.

Processing one or more electricity services transactions can additionally or alternatively include providing one or more receiving parties, providing parties, utility entities, and/or other suitable entities with one or more certificates (e.g., describing one or more corresponding electricity services transactions, such as transactions in which the entity participated, etc.).

Processing one or more electricity services transactions is preferably performed with one or more decentralized network systems (e.g., configured to communicate with one or more centralized computing systems, such as a centralized services system, etc.) but can additionally or alternatively be performed by one or more centralized computing systems (e.g., where a centralized computing system performs portions of processing an electricity services transaction, and where a decentralized network system performs other portions of processing the electricity services transaction; etc.), and/or any other suitable components.

Any suitable number of electricity services transactions can be processed at any suitable time and/or frequency (e.g., processing a plurality of electricity services transactions associated with a plurality of providing parties and a plurality of receiving parties, such as in parallel, such as to facilitate real time electricity services transaction processing and real time physical electricity services; etc.). In examples, processing one or more electricity services transactions can be performed before, during, and/or after dynamically facilitating electricity services (e.g., physical electricity services, etc.) corresponding to the one or more electricity services transactions.

However, processing electricity services transactions can be performed in any suitable manner.

3.5 Facilitating Electricity Services

Embodiments of the method 100 can include dynamically facilitating electricity services between the one or more providing parties and the one or more receiving parties based on the electricity services transaction S150, which can function to facilitate electricity provision by the providing party and electricity reception by the receiving party (e.g., while ensuring maintenance of safety metrics like load and frequency; etc.), such as in accordance with the electricity services transaction (e.g., in accordance with the electricity services transaction parameters; etc.).

Dynamically facilitating electricity services can include any one or more of causing, aiding, promoting, and/or otherwise facilitating electricity services. In an example, dynamically facilitating electricity services include determining a logical accounting for electricity provided by a providing party (e.g., to a first region and/or service area of a distribution grid; to a first distribution grid; etc.), and for electricity consumed by a receiving party (e.g., from a second region and/or service area of the distribution grid; from a second distribution grid; such as where a receiving party is exchanging monetary currency and/or other suitable components, for the providing party to resupply electricity to the electrical grid in an amount corresponding to the electricity consumption; etc.), where outputs associated with the logical accounting can be recorded (e.g., with a decentralized network system, etc.) and/or otherwise processed.

Dynamically facilitating electricity services can include determining one or more electricity services parameters describing the electricity services. Electricity services parameters can include one or more of electricity output (e.g., power output; amount of electricity provided by the providing party; output associated with one or more electricity provision parameters; etc.); electricity consumption (e.g., power consumption; amount of electricity received by a receiving party; consumption associated with one or more electricity reception parameters; etc.); associated utility data; inverter system data (e.g., smart inverter data; etc.); electricity meter data (e.g., smart meter data; etc.); ecological footprint characteristics (e.g., associated with the electricity services; etc.); and/or any other suitable parameters. In an example, electricity services can be characterized and/or verified (e.g., physically verifying electricity services transactions) with inverter system data (e.g., smart inverter data corresponding to electricity provision by one or more providing parties; etc.) and electricity meter data (e.g., smart meter data corresponding to electricity reception by one or more receiving parties; etc.). In an example, dynamically facilitating electricity services can include causing first power to be provided from a providing party to an electrical grid (e.g., distribution grid) based on an electricity services transaction (e.g., based on electricity services parameters of the electricity services transaction; etc.); causing second power to be consumed by a receiving party from the electrical grid based on the electricity services transaction; determining a power output associated with the first power based on an inverter system (e.g., smart inverter, etc.) associated with the electrical grid (e.g., with a first region and/or service area of the electrical grid, etc.); and determining a power consumption associated with the second power based on an electricity meter system (e.g., smart meter, etc.) associated with the electrical grid (e.g., a second region and/or service area of the electrical grid, etc.), where the method 100 can include updating, with the decentralized network system, the electricity services transaction (e.g., by performing portions of processing the electricity services transaction, etc.) based on the power output and the power consumption (e.g., updating parameters of the electricity services transaction to reflect parameters of the actual physical electricity services; updating balances based on the parameters of the actual physical electricity services; etc.). In an example (e.g., of cross-utilities balance settlement; etc.), updating the electricity services transaction can include updating, with the decentralized network system, a first balance of a first utility entity based on the power output, where the first utility entity is associated with the decentralized network system (e.g., is a participant in the decentralized network system; etc.) and the provided first power (e.g., the first utility entity received the first power; etc.); and updating, with the decentralized network system, a second balance of a second utility entity based on the power consumption, where the second utility entity is associated with the decentralized network system (e.g., is a participant in the decentralized network system; etc.) and the consumed second power (e.g., the utility entity provided the second power; etc.).

Dynamically facilitating electricity services can be performed with a distributed energy protocol, and/or with any other suitable components (e.g., centralized computing systems; decentralized network systems; etc.).

Dynamically facilitating electricity services can be performed according to electricity services transaction parameters of the electricity services transaction (e.g., performed according to electricity provision time parameters and electricity reception time parameters, such as parameters indicating agreed-upon time periods for electricity provision and electricity reception; etc.), but can additionally or alternatively be performed in temporal relation (e.g., in response to, etc.) to portions of processing an electricity services transaction (e.g., determination, execution, and/or other processing of a programmatic contract; etc.). In examples, dynamically facilitating electricity services can have one or more temporal relationships (e.g., performed in response to; performed before; performed after; initiates; performed in parallel; performed serially; etc.) with performing one or more portions of processing one or more electricity services transactions. In a specific example, the method 100 can include, in response to verifying electricity services corresponding to an electricity services transaction, recording associated parameters (e.g., recording electricity services parameters; updating electricity services transaction parameters; etc.), such as with a decentralized network system. However, dynamically facilitating electricity services can be performed at any suitable time and frequency.

Dynamically facilitating electricity services can additionally or alternatively include modifying power consumption (e.g., automatically; manually; "demand response"; etc.) based on price parameters and/or any other suitable parameters. For example, power consumption can be optimized by reducing power consumption (e.g., ceasing power consumption; ceasing power-consuming processes associated with a receiving party; etc.) when (e.g., in response to; after determining that; etc.) a real time price parameter is high (e.g., and/or when electricity demand is high), and by increasing power consumption (e.g., starting power consumption; running power-consuming processes associated with a receiving party; etc.) when a real time price parameter is low (e.g., and/or when electricity demand is low; etc.). In a specific example, dynamically facilitating electricity services can include determining a real time price parameter associated with predicted power consumption (e.g., associated with an electrical grid; associated with a region and/or service area corresponding to a location of a receiving party; based on any suitable variables informative of power consumption; etc.); in response to the real time price parameter satisfying a first threshold condition (e.g., below a price threshold; etc.), causing an increase in power consumption by the receiving party based on the electricity services transaction (e.g., in accordance with electricity services transaction parameters; etc.); and in response to the real time price parameter satisfying a second threshold condition (e.g., above a price threshold, etc.), causing a decrease in power consumption by the receiving party based on the electricity services transaction. Additionally or alternatively, modifying power consumption can be performed in any suitable manner.

However, dynamically facilitating electricity services can be performed in any suitable manner.

4.1 Example 1

Figure 7:
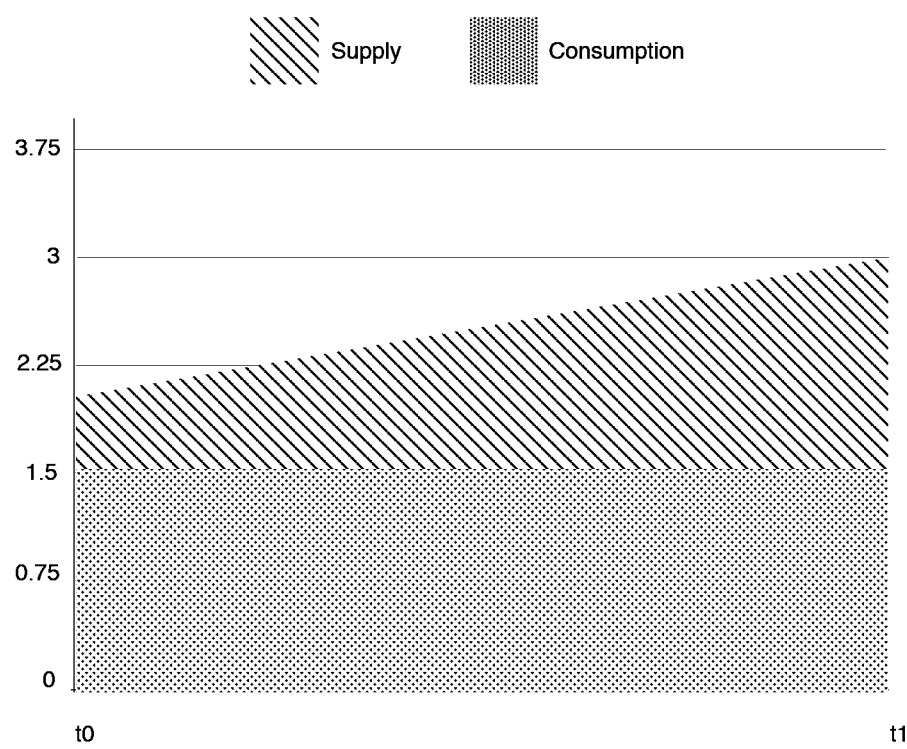
FIG. 7 includes a specific example of a portion of a method.

As shown in FIG. 7, a surplus power can be generated by a providing party during a time period from t0 to t1, which can be estimated as a difference between a providing party's expected power output and expected consumption during the time period.

Figure 8:
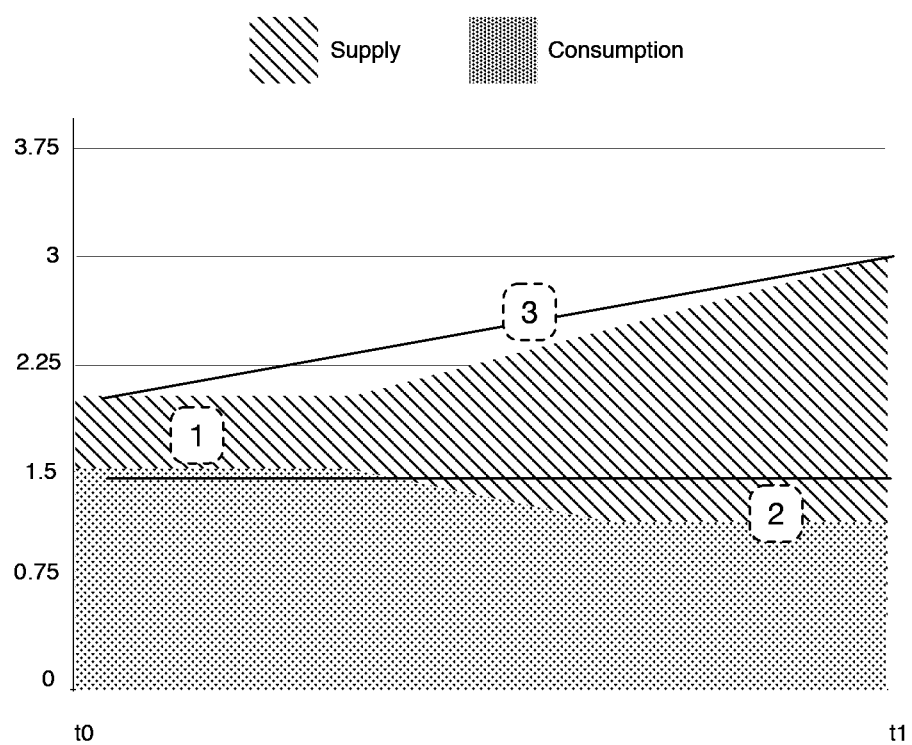
FIG. 8 includes a specific example of a portion of a method.

As shown in FIG. 8, an actual power supply and consumption by the providing party can be illustrated, where area 1 in FIG. 8 can represent a first part of the time period in which the providing party consumes electricity at a higher than expected level. The increase in consumption by the providing party (e.g., beyond the expected power consumption) can be supplied by the providing party's own supply of power (e.g., by a providing party's DER), but by subtracting from the amount of electricity agreed to be delivered to the receiving party. This can amount to an electricity deficit for the receiving party, which can be balanced with other resources (e.g., other providing parties; with power provided by the electrical grid, such as an electrical grid operator; etc.), where the liability for payment of the balancing can fall on the providing party (e.g., where the receiving party can continue to pay the agreed-upon rate; etc.). As such, adjustments at the physical level of the electricity services transaction can translate into adjustments at the transactional level for the party that deviated from expectations.

As shown in FIG. 8, area 2 can indicate a providing party consumption falling below an expected consumption level, creating a real-time power surplus, which can be integrated into a real time market (e.g., fulfilling a responsibility of a DSO), such as by bringing the power surplus to ancillary markets; by storing in a distribution side storage asset (e.g., owned by any suitable entity; etc.) used in reclaiming for own use, used for additional electricity services transactions, used as a real time resource, and/or used for any suitable purposes; by being integrated into dispatchable loads (e.g., electric vehicles, water heaters, energy management systems, others, etc.); by being used to balance power deficits occurring contemporaneously in associated with other receiving parties and/or providing parties, such as by determining an additional services match with another receiving party experiencing an increase in demand; and/or through any other suitable means.

As shown in FIG. 8, area 3 can indicate the providing party's power output falling under the expected power output level, which can be due to exogenous reasons (e.g., reasons not attributable to the providing party; etc.), such as short-time scale fluctuations inherent in types of power generation, where the providing party can be liable (e.g., through a liability restriction condition, etc.) for any suitable portion (e.g., zero to full, etc.), such as based on the degree to which fluctuations are not attributable to the providing party, based on the terms of an agreed-upon liability restriction condition; and or based on any suitable data.

However, accounting for providing party deficits and/or surpluses relative expected electricity output and/or expected electricity consumption can be performed in any suitable manner.

4.2 Example 2

Figure 9:
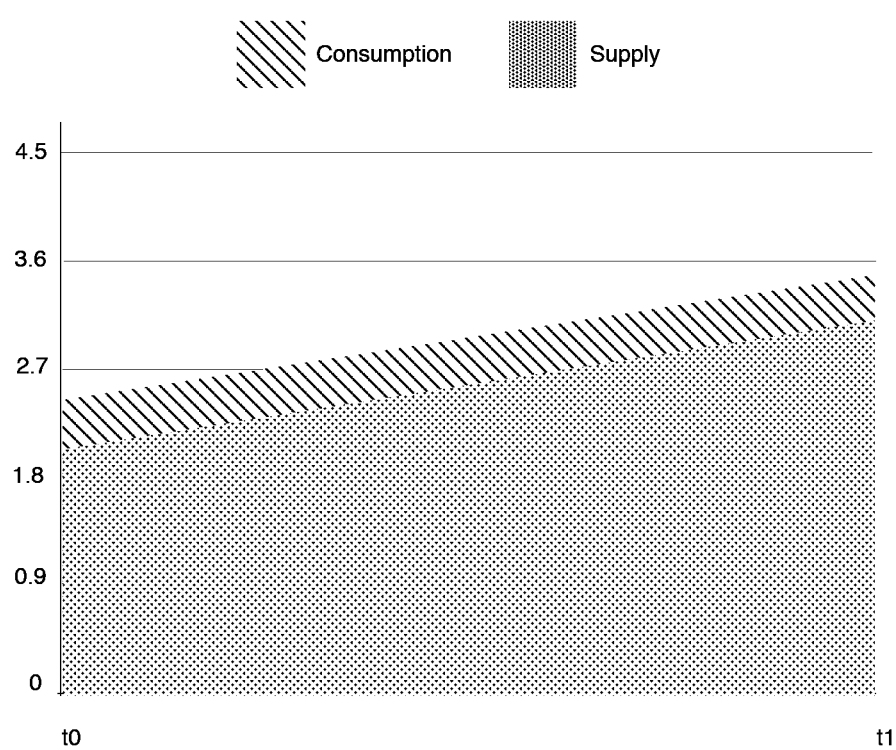
FIG. 9 includes a specific example of a portion of a method.

FIG. 9 can illustrate an expected power output profile of a providing party and an expected consumption profile for a receiving party, during a time period between t0 and t1. FIG. 9 can correspond to an electricity services transaction (e.g., a programmatic contract of the electricity services transaction) where a providing party agrees to deliver the amount of power indicated by the expected power output profile (e.g., the forecast, etc.), and the receiving party agrees to purchase that amount of power, where the top region of the graph can correspond to the difference between the receiving party's expected consumption and the power included in the transaction (e.g., expected power output), and where the difference can be, for example provided by a grid operator through the electrical grid (e.g., where the method 100 can include communicating relevant data to the grid operator and/or other suitable entity, such as for supporting electricity dispatching decisions, etc.).

Figure 10:
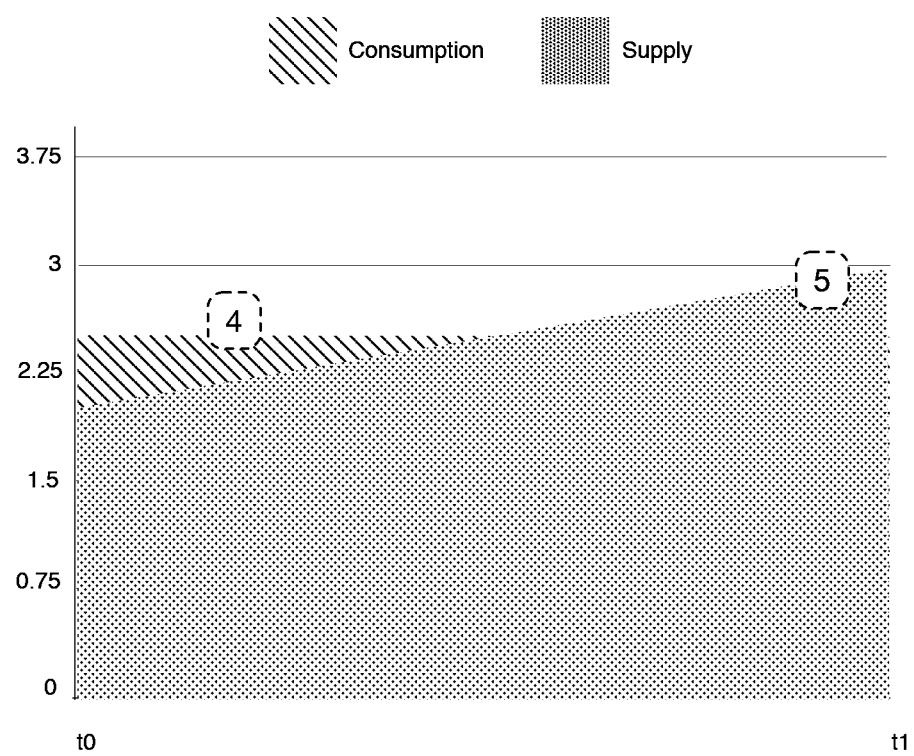
FIG. 10 includes a specific example of a portion of a method.

As shown in FIG. 10, a receiving party's actual consumption during the time period can deviate from expected, such as where the actual consumption is less than the expected consumption (e.g., the consumption agreed upon in the electricity services transaction; etc.). Area 4 indicates a period within the time period where receiving party consumption exceeds providing party supply, and the electricity services transaction is maintained for the receiving party to purchase and consume the providing party's supply. Area 5 indicates a later period within the time period where receiving party consumption falls below providing party supply, where the providing party thereby generates an energy surplus (e.g., that was originally agreed-upon to be consumed by the receiving party). In specific examples, the energy surplus can be used through one or more of: trading in real time for consumption by active loads (e.g., for balancing potential supply deficits in other transactions; etc.); dispatching a controllable load (e.g., distribution side ancillary service) and absorbing the surplus in real time; storing surplus, such as on behalf of the receiving party, who can later claim it for consumption, trade it, or use for participation in individual or pooled ancillary services; claiming by a different receiving party such as through an additional electricity services transaction for purchasing the surplus power (e.g., at favorable terms; etc.); curtailing; and/or any other suitable purpose using any suitable surplus management approaches.

Electricity services transactions can include electricity services transaction parameters indicating a preferred surplus management approach and/or approaches (e.g., a ranking of approaches; etc.). Receiving parties can possess no liability for smaller than expected consumption, or can possess any suitable degree of liability (e.g., agreed-upon through the parameters of the electricity services transaction; etc.). Utility entities, system operators, and/or other suitable entities who had planned to supply the additional electricity needed to satisfy the original expected consumption by the receiving party, can be communicated with to re-adjust supply downwards (e.g., reducing output from balancing plants, etc.).

However, accounting for receiving party deviations can be performed in any suitable manner.

4.3 Example 3

Embodiments of the method 100 can additionally or alternatively include determining one or more consumption pattern recommendations for one or more receiving parties (and/or one or more providing parties; etc.). For example, determining consumption pattern recommendations can be based on a real time energy source composition for an electrical grid (e.g., describing the amount of power originating from solar roofs, wind turbines, nuclear plants, coal plants, etc.), which can be used to determine a real time ecological footprint profile (e.g., carbon profile, etc.) for the electrical grid. The ecological footprint profile (e.g., predictive profile, etc.) for the electrical grid can vary over time, where associated data can be used in determining and/or presenting consumption pattern recommendations (e.g., increase consumption for a time period in response to the ecological footprint profile indicating a smaller ecological footprint characteristic, such as specific carbon footprint, for the time period; etc.). In a specific example, the method 100 can include determining a real time ecological footprint profile describing energy source composition for an electrical grid; determining a consumption pattern recommendation for the receiving party based on the real time ecological footprint profile and an electricity services transaction (e.g., where the electricity services transaction can be used in predicting energy-behavioral patterns, such as for use in combination with the real time ecological footprint profile to recommend consumption patterns accommodating the ecological footprint characteristics for a time period as well as the patterns associated with the receiving party; etc.); and presenting the consumption pattern recommendation to the receiving party at the receiving party interface. Additionally or alternatively, processing consumption pattern recommendations can include automatically implementing the consumption pattern recommendations. However, determining consumption pattern recommendations can be performed in any suitable manner.

4.4 Example 4

Embodiments of the method 100 can additionally or alternatively include providing a reliability service, such as through automatically adjusting electricity prices to discourage production and encourage consumption when supply overshadows demand (e.g., for improving energy use efficiency in the context of the market; etc.), and/or by enabling entities providing reliable sources of energy generation to provide energy to satisfy demands in situations where renewable sources are insufficient. However, providing reliability services can be performed in any suitable manner.

Embodiments of the system 200 and/or method 100 can include every combination and permutation of the various system components and the various method processes, including any variants (e.g., embodiments, variations, examples, specific examples, figures, etc.), where portions of the method 100 and/or processes described herein can be performed asynchronously (e.g., sequentially), concurrently (e.g., in parallel), or in any other suitable order by and/or using one or more instances, elements, components of, and/or other aspects of the system 200 and/or other entities described herein.

Any of the variants described herein (e.g., embodiments, variations, examples, specific examples, figures, etc.) and/or any portion of the variants described herein can be additionally or alternatively combined, aggregated, excluded, used, performed serially, performed in parallel, and/or otherwise applied.

The system 200 and/or method 100 and/or variants thereof can be embodied and/or implemented at least in part as a machine configured to receive a computer-readable medium storing computer-readable instructions. The instructions can be executed by computer-executable components that can be integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component can be a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the system 200, method 100, and/or variants without departing from the scope defined in the following claims.

We claim:

1. A method for facilitating electricity services, the method comprising:
   collecting a set of electricity provision parameters from a providing party at a providing party interface associated with a providing party device and configured to communicate with a centralized services system;
   collecting a set of electricity request parameters from a receiving party at a receiving party interface associated with a receiving party device and configured to communicate with the centralized services system;
   determining, at the centralized services system, a services match between the providing party and the receiving party based on the set of electricity provision parameters, the set of electricity request parameters, and a carbon mitigation parameter associated with a relative carbon benefit corresponding to power provision to the receiving party by the providing party, wherein determining the carbon mitigation parameter comprises:
      determining a first specific carbon footprint for grid power provision to the receiving party by an electrical grid;
      determining a second specific carbon footprint for the power provision to the receiving party by the providing party; and
      determining the carbon mitigation parameter based on the difference between the first and the second specific carbon footprints, wherein the difference is associated with the relative carbon benefit;
   processing, with a decentralized network system configured to communicate with the centralized services system, a first electricity services transaction based on the services match between the providing party and the receiving party, wherein the decentralized network system improves security and traceability associated with the electricity services, wherein processing the first electricity services transaction comprises, with the decentralized network system:
      recording, at a distributed ledger comprising decentralized nodes of the decentralized network system, a set of electricity services transaction parameters of the first electricity services transaction, wherein the set of electricity services transaction parameters comprises a price parameter, an energy parameter, a providing party identifier, and a receiving party identifier; and
      updating, at the decentralized nodes, a providing party balance and a receiving party balance based on the set of electricity services transaction parameters; and
   dynamically facilitating the electricity services between the providing party and the receiving party based on the first electricity services transaction.

2. The method of claim 1,
   wherein dynamically facilitating electricity services comprises:
      causing first power to be provided from the providing party to an electrical grid based on the first electricity services transaction;
      causing second power to be consumed by the receiving party from the electrical grid based on the first electricity services transaction;
      determining a power output associated with the first power based on an inverter system associated with the electrical grid; and
      determining a power consumption associated with the second power based on a smart electricity meter system associated with the electrical grid, and
   wherein the method further comprises updating, with the decentralized network system for improving the security and the traceability associated with the electricity services, the first electricity services transaction based on the power output and the power consumption.

3. The method of claim 2, wherein updating the first electricity services transaction comprises:
   updating, with the decentralized network system, a first balance of a first utility entity based on the power output, wherein the first utility entity is associated with the decentralized network system and the provided first power; and
   updating, with the decentralized network system, a second balance of a second utility entity based on the power consumption, wherein the second utility entity is associated with the decentralized network system and the consumed second power.

4. The method of claim 1,
   wherein the decentralized network system comprises a tokenless consortium blockchain system comprising the distributed ledger,
   wherein recording the set of electricity services transaction parameters comprises recording the set of electricity services transaction parameters with the tokenless consortium blockchain system, and
   wherein updating the providing party balance and the receiving party balance comprises updating the providing party balance and the receiving party balance with the decentralized nodes of the tokenless consortium blockchain system.

5. The method of claim 1,
   wherein processing, with the decentralized network system, the first electricity services transaction comprises determining a first liability restriction condition associated with restriction of liability for the first electricity services transaction to deviation between power output of the providing party and power consumption of the receiving party,
   wherein dynamically facilitating electricity services comprises determining the power output of the providing party, and
   wherein the method further comprises updating the first electricity services transaction based on the liability restriction condition and the power output of the providing party.

6. The method of claim 5,
   wherein the first liability restriction condition is associated with a specified power output type, and
   wherein the method further comprises:
      determining a second liability restriction condition associated with an expected power output type and agreement upon an expected power output of an additional providing party;
      determining the expected power output of the additional providing party;
      determining a price parameter based on the second liability restriction condition and the expected power output; and
      processing, with the decentralized network system, a second electricity services transaction based on the second liability restriction condition, the expected power output, and the price parameter.

7. The method of claim 1, further comprising:
   determining a real time ecological footprint profile describing energy source composition for an electrical grid;

determining a consumption pattern recommendation for the receiving party based on the real time ecological footprint profile and the first electricity services transaction; and presenting the consumption pattern recommendation to the receiving party at the receiving party interface.

8. The method of claim 1, wherein dynamically facilitating electricity services comprises:
   determining a real time price parameter associated with predicted power consumption;
   in response to the real time price parameter satisfying a first threshold condition, causing an increase in power consumption by the receiving party based on the first electricity services transaction; and
   in response to the real time price parameter satisfying a second threshold condition, causing a decrease in power consumption by the receiving party based on the first electricity services transaction.

9. The method of claim 1, wherein processing the first electricity services transaction comprises:
   in response to determining the services match, automatically determining a programmatic contract based on the set of electricity provision parameters and the set of electricity request parameters; and
   executing the programmatic contract with the decentralized network system configured to communicate with the centralized services system.

10. A method for facilitating electricity services, the method comprising:
    collecting a set of electricity provision parameters from a providing party, wherein the set of electricity provision parameters comprises an ecological footprint characteristic;
    collecting a set of electricity request parameters from a receiving party, wherein the set of electricity request parameters comprises an ecological footprint request characteristic;
    determining a services match between the providing party and the receiving party based on the ecological footprint characteristic, the ecological footprint request characteristic, and a carbon mitigation parameter associated with a relative carbon benefit corresponding to power provision to the receiving party by the providing party, wherein determining the carbon mitigation parameter comprises:
      determining a first specific carbon footprint for grid power provision to the receiving party by an electrical grid;
      determining a second specific carbon footprint for the power provision to the receiving party by the providing party; and
      determining the carbon mitigation parameter based on the difference between the first and the second specific carbon footprints, wherein the difference is associated with the relative carbon benefit;
    processing, with a first decentralized network system, an electricity services transaction based on the services match between the providing party and the receiving party, wherein the decentralized network system improves security and traceability associated with the electricity services, wherein processing the electricity services transaction comprises, with the first decentralized network system:
      recording, at a distributed ledger comprising decentralized nodes of the first decentralized network system, a set of electricity services transaction parameters of the electricity services transaction, wherein the set of electricity services transaction parameters comprises a price parameter, an energy parameter, a providing party identifier, and a receiving party identifier; and
      updating, at the decentralized nodes, a providing party balance and a receiving party balance based on the set of electricity services transaction parameters; and
    dynamically facilitating the electricity services between the providing party and the receiving party based on the electricity services transaction.

11. The method of claim 10,
    wherein the set of electricity provision parameters comprises a power provision parameter, a power provision time parameter, and a price parameter;
    wherein the set of electricity request parameters comprises a power reception parameter, a power reception time parameter, and a payment parameter; and
    wherein determining the services match between the providing party and the receiving party comprises determining the services match based on the power provision parameter, the power provision time parameter, the price parameter, the power reception parameter, the power reception time parameter, the payment parameter, the ecological footprint characteristic, and the ecological footprint request characteristic.

12. The method of claim 10,
    wherein determining the first specific carbon footprint comprises determining a first specific carbon footprint over time based on an electricity reception time parameter associated with the electricity services transaction and on a first location associated with the receiving party, wherein the electricity reception time parameter indicates a time period for which power will be received in association with the electricity services transaction,
    wherein determining the second specific carbon footprint comprises determining a second specific carbon footprint over time based on the electricity reception time parameter and on a second location associated with the providing party, and
    wherein determining the carbon mitigation parameter comprises determining the carbon mitigation parameter based on the first and the second specific carbon footprints over time.

13. The method of claim 10, wherein processing the electricity services transaction comprises processing a set of carbon mitigation tokens collected from the receiving party, wherein the set of carbon mitigation tokens corresponds to an amount of the relative carbon benefit associated with the electricity services transaction.

14. The method of claim 10,
    wherein determining the services match comprises determining, with a first services match model, the services match based on the carbon mitigation parameter, the ecological footprint characteristic and the ecological footprint request characteristic, and
    wherein the method further comprises determining, with a second services match model, an additional services match based on a price parameter and a payment parameter.

15. The method of claim 10, wherein processing the electricity services transaction comprises:
    processing, with a second decentralized network system configured to communicate with the first decentralized network system, a selective sourcing transaction based on a token associated with the second decentralized network system;

determining, with the first decentralized network system, a verification of the selective sourcing transaction; and processing, with the first decentralized network system, the electricity services transaction based on the verification of the selective sourcing transaction and the services match between the providing party and the receiving party.

16. The method of claim 10, wherein determining the services match comprises determining the services match between the receiving party and a plurality of providing parties based on the ecological footprint request characteristic and a plurality of ecological footprint characteristics associated with power provision by the plurality of providing parties, wherein processing the electricity services transaction comprises processing, with the first decentralized network system, the electricity services transaction based on the services match between the receiving party and the plurality of providing parties, and wherein dynamically facilitating electricity services comprises dynamically facilitating electricity services between the receiving party and the plurality of providing parties based on the electricity services transaction.

17. The method of claim 16, wherein determining the services match between the receiving party and the plurality of providing parties comprises determining an ecological footprint profile based on the ecological footprint request characteristic and the plurality of ecological footprint characteristics, wherein the ecological footprint profile comprises a plurality of energy source types associated with the power provision by the plurality of providing parties;

wherein processing the electricity services transaction comprises:

updating the ecological footprint profile based on the dynamically facilitated electricity services; and recording the updated ecological footprint profile at a distributed ledger of the first decentralized network system.

* * * * *